(12) United States Patent
Penot

(10) Patent No.: US 6,420,488 B1
(45) Date of Patent: Jul. 16, 2002

(54) COUPLING SYSTEM (WHITE FILLER/DIENE ELASTOMER) BASED ON POLYSULPHURIZED ALKOXYSILANE, ENAMINE, AND GUANIDINE DERIVATIVE

(75) Inventor: Christophe Penot, Chamaliéres (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/724,038

(22) Filed: Nov. 28, 2000

Related U.S. Application Data

(63) Continuation of application No. PCT/EP99/05158, filed on Jul. 20, 1999.

(30) Foreign Application Priority Data

Jul. 22, 1998 (FR) .............................. 98 09392
Mar. 1, 1999 (FR) .............................. 99 02605

(51) Int. Cl.⁷ ................................ C08C 19/00
(52) U.S. Cl. .................... 525/332.7; 252/183.14; 525/332.8; 525/337.9; 525/333.1; 525/333.2; 525/342
(58) Field of Search .............................. 525/332.7, 342; 252/183.14

(56) References Cited

U.S. PATENT DOCUMENTS 4,082,706 A  4/1978  Danielson

FOREIGN PATENT DOCUMENTS

| DE | 4435311 | 4/1996 |
| EP | 0634448 | 7/1994 |
| EP | 0846724 | 6/1997 |
| FR | 9708839 | 7/1997 |

*Primary Examiner*—Bernard Lipman
(74) *Attorney, Agent, or Firm*—Baker Botts LLP

(57) ABSTRACT

The present invention provides for a coupling system (white filler/diene elastomer) for a rubber composition based on diene elastomer reinforced with a white filler, formed by the association of a polysulphurized alkoxysilane, an enamine and a guanidine derivative. The invention also provides a rubber composition usable for the manufacture of tires, comprising, as base constituents, one or more diene elastomer(s), a reinforcing white filler, a polysulphurized alkoxysilane coupling agent (white filler/diene elastomer), with which are associated an enamine and a guanidine derivative. Also provided is a process for preparing such a rubber composition, and a tire or semi-finished product, in particular a tread for a tire, comprising a rubber composition according to the invention.

55 Claims, 5 Drawing Sheets

US 6,420,488 B1

COUPLING SYSTEM (WHITE FILLER/DIENE ELASTOMER) BASED ON POLYSULPHURIZED ALKOXYSILANE, ENAMINE, AND GUANIDINE DERIVATIVE

This is a Continuation of PCT Application No. PCT/EP99/05158 filed Jul. 20, 1999 now WO 00/05300.

BACKGROUND OF THE INVENTION

The present invention relates to diene rubber compositions reinforced with a white filler, which are intended, in particular, for the manufacture of tires or semi-finished products for tires, in particular, treads for these tires.

Since fuel economies and the need to protect the environment have become priorities, it has become desirable to produce elastomers with good mechanical properties and as low a hysteresis as possible so that they can be used in the form of rubber compositions for the manufacture of various semi-finished products involved in the constitution of tires, including inter alia, underlayers, calendering or sidewall rubbers, or treads, and to obtain tires with improved properties, in particular, reduced rolling resistance.

To achieve such an objective, numerous solutions have been proposed, such as those essentially concentrating on the use of elastomers modified by means of agents, such as coupling, starring or functionalizing agents, with carbon black as the reinforcing filler, with the aim of obtaining a good interaction between the modified elastomer and the carbon black. It is generally known that, in order to obtain the optimum reinforcement properties imparted by a filler, the latter should be present in the elastomeric matrix in a final form which is both as finely divided as possible and distributed as homogenously as possible. Currently, such conditions may only be obtained insofar as the filler has a very good ability, first, to be incorporated into the matrix during mixing with the elastomer and to disagglomerate and, second, to be dispersed homogenously in this matrix.

It is well known that while carbon black has such abilities, it is generally not true of white fillers. For reasons of mutual attraction, white filler particles have an irritating tendency to agglomerate together within the elastomeric matrix. These interactions have the harmful consequence of limiting the dispersion of the filler and hence its reinforcing properties to a level substantially lower than which it would be theoretically possible to achieve if all the (white filler/elastomer) bonds that could be created during the mixing operation were in fact obtained. These interactions further tend to increase the consistency of the rubber compositions and, therefore, to make them more difficult to work ("processability") in the uncured state than if carbon black were used as filler.

However, interest in rubber compositions reinforced with white filler was greatly revived with the publication of European Patent Application EP-A-0 501 227, which discloses a sulphur-vulcanizable diene rubber composition, reinforced with a special precipitated silica of the highly dispersible type, which makes it possible to manufacture a tire or tread with substantially improved rolling resistance, without adversely affecting the other properties, in particular those of grip, endurance and wear resistance. Application EP-A-0 810 258 discloses a novel diene rubber composition reinforced with another special white filler, i.e., a specific alumina ($Al_2O_3$) of high dispersibility, which also makes it possible to obtain tires or treads having an excellent compromise of contradictory properties.

Although the use of these specific, highly dispersible silicas or aluminas as reinforcing fillers, whether or not as the major component, has reduced the difficulty of processing the rubber compositions that contain them, such compositions are still more difficult to process than rubber compositions filled conventionally with carbon black.

In particular, it is necessary to use a coupling agent, also known as a bonding agent, the function of which is to provide the connection between the surface of the white filler particles and the elastomer, while also facilitating the dispersion of this white filler within the elastomeric matrix.

The term "coupling agent" (white filler/elastomer) is understood by those skilled in the art to mean an agent capable of establishing a sufficient chemical and/or physical connection between the white filler and the elastomer. Such a coupling agent, which is at least bifunctional, has, for example, the simplified general formula "Y—T—X", in which:

Y represents a functional group ("Y" function) which is capable of bonding physically and/or chemically with the white filler, such a bond being able to be established, for example, between a silicon atom of the coupling agent and the hydroxyl (OH) surface groups of the white filler (for example, surface silanols in the case of silica);

X represents a functional group ("X" function) which is capable of bonding physically and/or chemically with the elastomer, for example by means of a sulphur atom;

T represents a hydrocarbon group making it possible to link Y and X.

Such coupling agents are not to be confused with simple agents for covering the white filler which, in known manner, may comprise the above-cited Y function which is active with respect to the white filler but are devoid of the X function which is active with respect to the elastomer.

Silica/elastomer coupling agents, in particular, have been described in a large number of documents, the best known being bifunctional alkoxysilanes.

In patent application FR-A-2 094 859 it was proposed to use a mercaptosilane for the manufacture of tire treads. It was quickly shown, and is today well known, that the mercaptosilanes, particularly γ-mercaptopropyltrimethoxysilane or γ-mercaptopropyltriethoxysilane, are capable of giving excellent silica/elastomer coupling properties, but that these coupling agents cannot be used industrially because of the high reactivity of the —SH functions. Such high reactivity very rapidly results in premature vulcanization during the preparation of the rubber composition in an internal mixer, known as "scorching", which results in very high Mooney plasticity values and, ultimately, results in rubber compositions which are virtually impossible to work and process industrially. FR-A-2 206 330 and U.S. Pat. No. 4,002,594 illustrate the impossibility of industrially using such coupling agents bearing —SH functions and the rubber compositions that contain them.

To overcome this drawback, it has been proposed to replace these mercaptosilanes by polysulphurized alkoxysilanes, in particular bis-trialkoxy($C_1$–$C_4$) silylpropyl polysulphides, such as described in numerous patents or patent applications (see for example FR-A-2 206 330, U.S. Pat. No. 3,842,111, U.S. Pat. No. 3,873,489, U.S. Pat. No. 3,978,103 or U.S. Pat. No. 3,997,581). Among these polysulphides, particular mention is made of bis-3-triethoxysilylpropyl disulphide (abbreviated to TESPD), and more particularly bis-3-triethoxysilylpropyl tetrasulphide (abbreviated to TESPT), the latter is currently regarded as the product which, for vulcanized rubber compositions filled with silica, gives the best compromise in terms of resistance to scorching, processability and reinforcing power.

During the course of research, the Inventor discovered that the use of an enamine in a small quantity, in combination with a guanidine derivative, had the unexpected effect of activating the coupling function of the polysulphurized alkoxysilanes, resulting in increased effectiveness of the latter.

Due to this activation, it is possible in particular to substantially reduce the quantity of polysulphurized alkoxysilanes which are usually used in rubber compositions. This is particularly advantageous because these alkoxysilanes are very expensive and also have to be used in a large quantity, generally in the order of two to three times more than the quantity of y-mercaptopropyltrialkoxysilanes necessary to obtain levels of equivalent coupling properties. See, e.g., U.S. Pat. No. 5,652,310, U.S. Pat. No. 5,684,171 and U.S. Pat. No. 5,684,172. Thus, the present invention can significantly reduce the overall cost of the rubber compositions, as well as that of the tires and/or tire components containing them.

SUMMARY OF THE INVENTION

Consequently, a first subject of the invention relates to a rubber composition usable for the manufacture of tires, comprising one or more diene elastomer(s), a reinforcing white filler, a polysulphurized alkoxysilane as coupling agent (white filler/diene elastomer), with which are associated an enamine and a guanidine derivative.

Another subject of the invention is the use of a rubber composition according to the invention for the manufacture of rubber articles, in particular tires or semi-finished products intended for such tires, these semi-finished products being selected from the group consisting of treads, underlayers intended, for example, to be positioned beneath these treads, crown plies, sidewalls, carcass plies, beads, protectors, inner tubes and airtight internal rubbers for tubeless tires. The invention relates more particularly to the use of such a rubber composition for the manufacture of the sidewalls or treads, owing to its good hysteretic properties.

The invention also relates to a process for the preparation of a rubber composition according to the invention, this process being characterized in that there are incorporated by kneading into one or more diene elastomer(s), a white filler as reinforcing filler, a polysulphurized alkoxysilane coupling agent (white filler/diene elastomer), an enamine and a guanidine derivative. The invention also encompasses the rubber composition prepared by this process.

The composition according to the invention is particularly suitable for the building of treads for tires intended to be fitted on passenger vehicles, 4×4 vehicles, vans, two-wheelers and heavy vehicles, aircraft, or construction, agricultural or handling machinery, these treads being able to be used in the manufacture of new tires or for recapping worn tires.

The subject of the invention is also these tires and these semi-finished rubber products themselves, in particular the treads, comprising a rubber composition according to the invention.

The invention also relates, per se, to a coupling system (white filler/diene elastomer) for a diene rubber composition reinforced with a white filler, usable for the manufacture of tires, said system being formed by the association of a polysulphurized alkoxysilane, an enamine and a guanidine derivative.

The subject of the invention is also the use of such a coupling system (white filler/diene elastomer) in a rubber composition for a tire.

The subject of the invention is furthermore the use in combination of an enamine and a guanidine derivative, in the rubber compositions reinforced by a white filler usable for manufacturing tires, for activating the coupling function (white filler/diene elastomer) of the polysulphurized alkoxysilane.

The invention and its advantages will be readily understood in the light of the description and examples of embodiment which follow, and of the figures relating to these examples, which show curves of the variation of modulus as a function of elongation for different diene rubber compositions, whether or not in accordance with the invention.

DETAILED DESCRIPTION OF PREFERRED EMBODIMENTS

I. MEASUREMENTS AND TESTS USED

Figure 1:
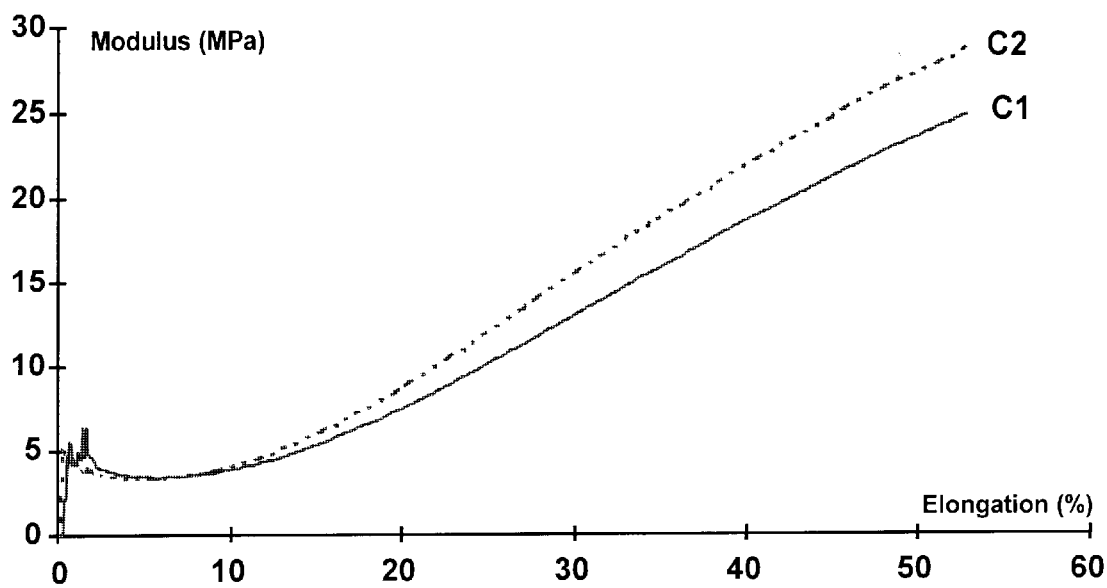
FIG. 1 is a graph showing the curves of variation of the modulus as a function of elongation ($C_1$ and $C_2$) for the diene rubber compositions of Test 1.

The rubber compositions are characterized before and after curing, as follows.

I-1. Mooney Plasticity

An oscillating consistometer such as described in standard AFNOR-NFT-43005 (November 1980) is used. The Mooney plasticity is measured in accordance with the following principle: the raw composition (i.e., before curing) is molded in a cylindrical enclosure heated to 100° C. After one minute's preheating, the rotor turns within the test sample at 2 rpm, and the torque used for maintaining this movement is measured after four minutes' rotation. The Mooney plasticity (ML 1+4) is expressed in "Mooney units" (MU, with 1 MU=0.83 Newton.meter).

I-2. Scorching Time

The measurements are carried out at 130° C., in accordance with standard AFNOR-NFT-43004 (November 1980). The evolution of the consistometric index as a function of time makes it possible to determine the scorching time for the rubber compositions, assessed in accordance with the above standard by the parameter T5, expressed in minutes, and defined as being the time necessary to obtain an increase in the consistometric index (expressed in MU) of 5 units above the minimum value measured for this index.

I-3. Tensile Tests

These tests make it possible to determine the elasticity stresses and the properties at break. Unless indicated otherwise, they are effected in accordance with standard AFNOR-NFT-46002 of September 1988. The nominal secant moduli (in MPa) at 10% elongation (M 10), 100% elongation (M100) and 300% elongation (M300) are measured in a second elongation (i.e., after an accommodation cycle). The breaking stresses (in MPa) and the elongations at break (in %) are also measured. All these tensile measurements are carried out under normal conditions of temperature and humidity in accordance with standard AFNOR-NFT-40101 (December 1979).

Processing the tensile data recorded also makes it possible to trace the curve of the modulus as a function of the elongation (see attached FIGS. 1–9), the modulus used here being the true secant modulus measured in a first elongation, calculated reduced to the real cross-section of the test piece, and not to the initial section as previously for the nominal moduli.

I-4. Hysteresis Losses

The hysteresis losses (HL) are measured by rebound at 60° C. at the sixth impact, and are expressed in % in accordance with the following equation ($W_0$: energy supplied; $W_1$: energy restored):

$$HL(\%)=100[(W_0-W_1)/W_0]$$

II. CONDITIONS OF CARRYING OUT THE INVENTION

In addition to the usual additives or those capable of being used in a sulphur-vulcanizable diene rubber composition which is intended particularly for the manufacture of tires, the rubber compositions according to the invention comprise, as base constituents, (i) at least one diene elastomer, (ii) at least a white filler as reinforcing filler, (iii) at least one polysulphurized alkoxysilane as coupling agent (white filler/diene elastomer) with which are associated, in order to activate the coupling, (iv) at least one enamine and (v) at least one guanidine derivative.

The coupling system according to the invention itself comprises a polysulphurized alkoxysilane coupling agent, preferably in a majority (i.e. more than 50% by weight), and a coupling activator formed by the association of an enamine and a guanidine derivative.

II-1. Diene Elastomer

"Diene" elastomer or rubber is understood herein to mean, an elastomer resulting at least in part (i.e. a homopolymer or a copolymer) from diene monomers (monomers bearing two double carbon-carbon bonds, whether conjugated or not).

Generally, "essentially unsaturated" diene elastomer is understood here to mean a diene elastomer resulting at least in part from conjugated diene monomers, having a content of members or units of diene origin (conjugated dienes) which is greater than 15% (mole %).

Thus, for example, diene elastomers such as butyl rubbers or copolymers of dienes and of alpha-olefins of the EPDM type do not fall within the preceding definition, and may in particular be described as "essentially saturated" diene elastomers (low or very low content of units of diene origin which is always less than 15%).

Within the category of "essentially unsaturated" diene elastomers, "highly unsaturated" diene elastomer is understood to mean a diene elastomer having a content of units of diene origin (conjugated dienes) which is greater than 50%.

These definitions being given, the following are understood to be meant by diene elastomer capable of being used in the compositions according to the invention:

(a) any homopolymer obtained by polymerization of a conjugated diene monomer having 4 to 12 carbon atoms;

(b) any copolymer obtained by copolymerization of one or more dienes conjugated together or with one or more vinyl aromatic compounds having 8 to 20 carbon atoms;

(c) a ternary copolymer obtained by copolymerization of ethylene, of an α-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene;

(d) a copolymer of isobutene and isoprene (butyl rubber), and also the halogenated, in particular chlorinated or brominated, versions of this type of copolymer.

Although it applies to any type of diene elastomer, the person skilled in the art of tires will understand that the present invention, in particular when the rubber composition is intended for a tire tread, is used first and foremost with essentially unsaturated diene elastomers, in particular those of type (a) or (b) above.

Suitable conjugated dienes include, 1,3-butadiene, 2-methyl-1,3-butadiene, 2,3-di(C1 to C5 alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene.

Suitable vinyl aromatic compounds are, in particular, styrene, ortho-, meta- and para-methylstyrene, the commercial mixture "vinyl-toluene", para-tertiobutylstyrene, the methoxy-styrenes, the chloro-styrenes, vinyl mesitylene, divinyl benzene and vinyl naphthalene.

The copolymers may contain between 99% and 20% by weight of diene units and between 1% and 80% by weight of vinyl aromatic units. The elastomers may have any microstructure, which is a function of the polymerization conditions used, in particular of the presence or absence of a modifying and/or randomizing agent and the quantities of modifying and/or randomizing agent used. The elastomers may for example be block, statistical, sequenced or microsequenced elastomers, and may be prepared in dispersion or in solution. They may be coupled and/or starred or alternatively functionalized with a coupling and/or starring or functionalizing agent.

Preferred polymers include polybutadienes, in particular those having a content of 1,2-units of between 4% and 80%, or those having a content of cis-1,4 [bonds] of more than 80%, polyisoprenes, butadiene-styrene copolymers, in particular those having a styrene content of between 5% and 50% by weight and, more particularly, between 20% and 40%, a content of 1,2-bonds of the butadiene part of between 4% and 65%, and a content of trans-1,4 bonds of between 20% and 80%, butadiene-isoprene copolymers, in particular those having an isoprene content of between 5% and 90% by weight and a glass transition temperature (Tg) of between −40° C. and −80° C., and isoprene-styrene copolymers, in particular those having a styrene content of between 5% and 50% by weight and a Tg of between −25° C. and −50° C.

Suitable butadiene-styrene-isoprene copolymers include those having a styrene content of between 5% and 50% by weight, more particularly, between 10% and 40%, an isoprene content of between 15% and 60% by weight, more particularly between 20% and 50%, a butadiene content of between 5% and 50% by weight, more particularly between 20% and 40%, a content of 1,2-units of the butadiene part of between 4% and 85%, a content of trans-1,4 units of the butadiene part of between 6% and 80%, a content of 1,2-plus 3,4-units of the isoprene part of between 5% and 70%, and a content of trans-1,4 units of the isoprene part of between 10% and 50%, and more generally any butadiene-styrene-isoprene copolymer having a Tg of between −20° C. and −70° C.

Preferably, the diene elastomer of the composition according to the invention is selected from among highly unsaturated diene elastomers which include polybutadienes (BR), polyisoprenes (IR) or natural rubber (NR), butadiene-styrene copolymers (SBR), butadiene-isoprene copolymers (BIR), isoprene-styrene copolymers (SIR), butadiene-styrene-isoprene copolymers (SBIR), or a mixture of two or more of these compounds.

The composition according to the invention is preferably intended for a tread for a tire. In such a case, the diene elastomer is preferably a butadiene-styrene copolymer, optionally used in a mixture with a polybutadiene. More preferably, the diene elastomer is an SBR prepared in solution having a styrene content of between 20% and 30% by weight, a content of vinyl bonds of the butadiene part of between 15% and 65%, a content of trans-1,4 bonds of between 15% and 75%, and a Tg of between −20° C. and −55° C. The SBR copolymer may also be used in a mixture with a polybutadiene having preferably more than 90% cis-1,4 bonds.

The compositions of the invention may contain a single diene elastomer or a mixture of several diene elastomers. The diene elastomer or elastomers optionally may be used in association with any type of synthetic elastomer other than a diene elastomer, or even with polymers other than elastomers, for example thermoplastic polymers.

II-2. Reinforcing Filler

The white filler used as reinforcing filler may constitute all or only part of the total reinforcing filler, in the latter case associated, for example, with carbon black.

Preferably, in the rubber compositions according to the invention, the reinforcing white filler constitutes the majority, i.e. more than 50% by weight, of the total reinforcing filler, more preferably more than 80% by weight of this total reinforcing filler.

In the present application, "reinforcing" white filler is understood to mean a white filler (sometimes also called "clear filler") which is capable, on its own, without any other means than an intermediate coupling agent, of reinforcing a rubber composition intended for the manufacture of tires. In other words the reinforcing white filler is capable of replacing a conventional filler of carbon black in its reinforcement function.

Preferably, the reinforcing white filler is a mineral filler, in particular silica ($SiO_2$). The silica used may be any reinforcing silica known to the person skilled in the art, in particular any precipitated or pyrogenic silica having a BET surface area and a specific CTAB surface area both of which are less than 450 $m^2/g$. The highly dispersible precipitated silicas are preferred, in particular when the invention is used to manufacture tires having a low rolling resistance. "Highly dispersible silica" is understood to mean any silica having a very substantial ability to disagglomerate and to disperse in an elastomeric matrix, which can be observed in known manner by electron or optical microscopy on thin sections.

Non-limiting examples of such preferred highly dispersible silicas include the silica Perkasil KS 430 from Akzo, the silicas BV3380 and Ultrasil 7000 from Degussa, the silicas Zeosil 1165 MP and 1115 MP from Rhodia, the silica Hi-Sil 2000 from PPG, the silicas Zeopol 8715, 8741 or 8745 from Huber, and treated precipitated silicas such as, for example, the aluminium-"doped" silicas described in application EP-A-0 735 088. If a reinforcing alumina is used, this is preferably a highly dispersible alumina such as described in application EP-A-0 810 258, for example aluminas A125 or CR125 (from Baïkowski), APA-100RDX (from Condea), Aluminoxid C (from Degussa) or AKP-G015 (Sumitomo Chemicals).

The physical state in which the reinforcing white filler is present is immaterial, whether it be in the form of a powder, microbeads, granules or alternatively balls. Of course, "reinforcing white filler" is also understood to mean mixtures of different reinforcing white fillers, in particular of highly dispersible silicas such as described above.

The reinforcing white filler may also be used in a blend (mixture) with carbon black. Suitable carbon blacks are all the carbon blacks, in particular the blacks of the type HAF, ISAF and SAF, which are conventionally used in tires, and particularly in treads for tires. As non-limitative examples of such blacks, mention may be made of the blacks N115, N134, N234, N339, N347 and N375. The amount of carbon black in the total reinforcing filler may vary within wide limits, this amount preferably being less than the total amount of reinforcing white filler present in the rubber composition.

Preferably, the amount of total reinforcing filler (reinforcing white filler plus carbon black if applicable) lies in a range from 20 to 300 phr, more preferably from 30 to 150 phr, even more preferably from 50 to 130 phr (parts by weight to one hundred parts of elastomer), the optimum differing according to the nature of the reinforcing white filler used and the intended applications. For example, the level of reinforcement expected of a bicycle tire is known to be distinctly lower than that required for a tire capable of travelling at a sustained high speed, for example a motor-cycle tire, a passenger-vehicle tire or a tire for a utility vehicle such as a heavy vehicle.

II-3. Coupling Agent

The coupling agent used in the rubber compositions according to the invention is a polysulphurized alkoxysilane, which bears two types of functions referred to here as "Y" and "X", which can be grafted first on the white filler by means of the "Y" function (alkoxysilyl function) and second on the elastomer by means of the "X" function (sulphur function).

Polysulphurized alkoxysilanes are well-known to persons skilled in the art as coupling agents (white filler/diene elastomer) in rubber compositions intended for the manufacture of tires. See, in particular, U.S. Pat. No. 3,842,111, U.S. Pat. No. 3,873,489, U.S. Pat. No. 3,978,103, U.S. Pat. No. 3,997,581, or the more recent U.S. Pat. No. 5 580 919, U.S. Pat. No. 5 583 245, U.S. Pat. No. 5,663,396, U.S. Pat. No. 5,684,171, U.S. Pat. No. 5,684,172, U.S. Pat. No. 5,696,197, which describe such known compounds in detail.

Particularly suitable coupling agents for implementing the invention, without the definition below being limiting, are so-called "symmetrical" polysulphurized alkoxysilanes which satisfy the following general formula (I):

$$Z-A-S_n-A-Z, \qquad (I)$$

in which:

n is an integer from 2 to 8;

A is a divalent hydrocarbon radical;

Z corresponds to one of the formulae below:

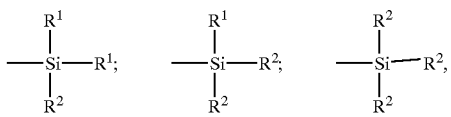

in which:

R$^1$, which may or may not be substituted, and may be identical or different, represents a C$_1$–C$_{18}$ alkyl group, a C$_5$–C$_{18}$ cycloalkyl group, or a C$_6$–C$_{18}$ aryl group;

R$^2$, which may or may not be substituted, and may be identical or different, represents a C$_1$–C$_{18}$ alkoxyl group or a C$_5$–C$_{18}$ cycloalkoxyl group.

In formula (I) above, the number n is preferably a whole number from 2 to 5, more preferably from 3 to 5.

In the case of a mixture of polysulphurized alkoxysilanes in accordance with Formula (I) above, in particular conventional, commercially available, mixtures, the average value of the "n"s is a fractional number, preferably between 3 and 5, more preferably close to 4. However, the invention may also be implemented advantageously for example with disulphurized alkoxysilanes (n=2).

The radical A, whether substituted or not, is preferably a divalent, saturated or non-saturated hydrocarbon radical, comprising 1 to 18 carbon atoms. In particular C$_1$–C$_{18}$ alkylene groups or C$_6$–C$_{12}$ arylene groups, more particularly C$_1$–C$_{10}$ alkylenes, notably C$_2$–C$_4$ alkylenes, in particular propylene, are suitable.

R$^1$ is preferably a C$_1$–C$_6$ alkyl, a cyclohexyl or a phenyl group, in particular a C$_1$–C$_4$ alkyl group, more particularly methyl and/or ethyl.

R$^2$ is preferably a C$_1$–C$_8$ alkoxyl group or a C$_5$–C$_8$ cycloalkoxyl group, more particularly methoxyl and/or ethoxyl.

Such so-called "symmetrical" polysulphurized alkoxysilanes, and some of the processes for obtaining them are described, for example, in U.S. Pat. No. 5,684,171 and U.S. Pat. No. 5,684,172, which give a detailed list of these known compounds, for n varying from 2 to 8.

Preferably, the polysulphurized alkoxysilane used in the invention is a polysulphide, in particular a disulphide or a tetrasulphide, of bis(alkoxy (C$_1$–C$_4$)silylpropyl), more preferably of bis(trialkoxy(C$_1$–C$_4$)silylpropyl), in particular of bis(3-triethoxysilylpropyl) or of bis(3-trimethoxysilylpropyl). By way of example, bis(triethoxysilylpropyl) disulphide, or TESPD, of the formula [(C$_2$H$_5$O)$_3$Si(CH$_2$)$_3$S]$_2$, is sold, for example, by Degussa under the names Si266 or Si75 (in the latter case, in the form of a mixture of disulphide (75% by weight) and of polysulphide), or alternatively by Witco under the name Silquest A1589. Bis(triethoxysilylpropyl) tetrasulphide, or TESPT, of the formula [(C$_2$H$_5$O)$_3$Si(CH$_2$)$_3$S$_2$]$_2$, is sold, for example by Degussa under the name Si69 (or X50S when it is supported to 50% by weight on carbon black), or alternatively by Witco under the name Silquest A 1289 (in both cases, a commercial mixture of polysulphides having an average value of n which is close to 4).

Most preferably, TESPT is used. However, one advantageous embodiment of the invention uses TESPD which, although less active than TESPT when it is used on its own, has an effectiveness which is substantially improved by the presence of the enamine and guanidine derivative of the invention.

Another example of a polysulphurized organosilane, comprises an organosilane of the polymeric (or oligomeric) type as described in applications WO96/10604 or DE-A-44 35 311 which corresponds to formula (II) below:

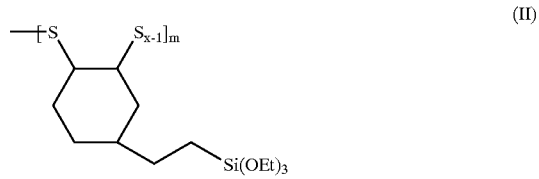

in which x=1 to 8, m=1 to 200, and OEt represents an ethoxyl radical.

In the rubber compositions according to the invention, the content of polysulphurized alkoxysilane may be within a range of 0.5 to 15% relative to the weight of reinforcing white filler, but it is generally desirable to use as little thereof as possible. The presence of enamine and guanidine derivative, in these compositions, advantageously make it possible to be able to use the polysulphurized alkoxysilane in a preferred amount of less than 8%, more preferably still less than 6%, relative to the weight of reinforcing white filler. Amounts of between 3% and 6% are, for example, possible.

The polysulphurized alkoxysilane may be first grafted (via the "X" function) on to the diene elastomer of the composition of the invention, wherein the elastomer thus functionalized or "precoupled" comprises the free "Y" function for the reinforcing white filler. The polysulphurized alkoxysilane could also be grafted beforehand (via the "Y" function) on the reinforcing white filler, the thus "precoupled" filler then being able to be bonded to the diene elastomer by means of the free "X" function of the coupling agent.

However, it is preferred to use the coupling agent either grafted on the reinforcing white filler or in the free (i.e. non-grafted) state, in particular for reasons of better working of the compositions in the uncured state, like the enamine and the guanidine derivative which are associated therewith in the coupling system according to the invention.

II-4. Activation of the Coupling

The coupling system according to the invention comprises the polysulphurized alkoxysilane coupling agent previously defined and a coupling activator for this alkoxysilane. Coupling "activator" is understood here to mean a body (a compound or an association of compounds) which, when mixed with the coupling agent, increases the effectiveness of the latter.

The coupling activator used according to the invention is formed by the association of an enamine and a guanidine derivative.

A) Enamine

An enamine corresponds to the general structure R$_2$C=CR—NR$_2$, in other words to the following developed formula (III):

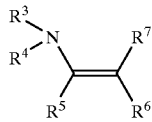

in which the radicals R$^3$ and R$^4$, which may be identical or different, represent a hydrocarbon group having preferably 1 to 20 carbon atoms; the radicals R$^5$, R$^6$ and R$^7$, which may be identical or different, represent a hydrogen atom or a hydrocarbon group having preferably 1 to 20 carbon atoms.

The radicals $R^3$ to $R^7$ above may be straight-chain, cyclic or branched, and substituted or non-substituted. By way of example, two of these radicals could be joined to form a cycle with the nitrogen atom in which a second heteroatom, selected, for example, from among S, O and N, might be present.

The enamines are obtained in known manner by reacting an aldehyde or a ketone on a secondary amine. They have been described, as have processes for obtaining them, for example, in U.S. Pat. No. 4,082,706 or EP-A-0 634 448, as antiozonants or vulcanization accelerators for natural or synthetic rubbers.

A preferred enamine which can be used in the compositions of the invention, is the enamine corresponding to the following formula (III-0):

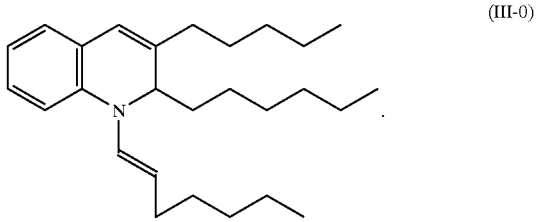

(III-0)

Such an enamine has been described in the aforementioned application EP-A-0 634 448 (see formula III). Examples of commercial enamines corresponding to this formula (III-0) include the enamines sold by Great Lakes Chemical Italia (Italy) under the names Meramid FC and Meramid EN.

Other preferred enamines include the enamines derived from dibutylamine, aniline, piperidine or pyrrolidine, such as, for example, 1-pyrrolidino-1-cyclopentene (compound of formula III-1) or 1-pyrrolidino-1-cyclohexene (compound of formula III-2):

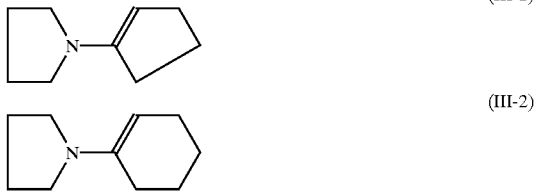

(III-1)

(III-2)

A person skilled in the art, having taken note of the invention, will be able to adjust the optimum content of enamine according to the intended application, the white filler used and the nature of the elastomer used without undue experimentation, within a range of preferably between 0.1 and 3 phr, more preferably between 0.2 and 1 phr. Amounts of between 0.2 and 0.6 phr are advantageously possible.

The optimum content of enamine is selected primarily as a function of the amount of polysulphurized alkoxysilane used. Preferably, in the coupling system according to the invention, the quantity of enamine represents between 1% and 25% relative to the weight of polysulphurized alkoxysilane. Below the minimum amounts indicated, the enhancing effect risks being inadequate, whereas beyond the maximum amounts indicated generally no further improvement in the coupling is observed, whereas the costs of the composition increase, and there is the risk of scorching mentioned previously. For the reasons set forth above, the quantity of enamine is more preferably between 3% and 17.5% relative to the weight of polysulphurized alkoxysilane.

Preferably, in the rubber compositions according to the invention, the total quantity of polysulphurized alkoxysilane and of enamine represents less than 10%, more preferably less than 8%, relative to the weight of reinforcing white filler. Advantageously, this quantity may be between 4% and 8%.

B) Guanidine Derivative

The second component necessary for activation of the coupling is a guanidine derivative, i.e., a substituted guanidine. Substituted guanidines are well-known to persons skilled in the art, in particular as vulcanization agents, and have been described in numerous documents (see, for example, "Vulcanization and vulcanizing agents" by W. Hofmann, Ed. MacLaren and Sons Ltd (London), 1967, pp. 180–182; EP-A-0 683 203 or U.S. Pat. No. 5,569,721).

In the compositions according to the invention, preferably N,N'-diphenylguanidine (abbreviated to "DPG") is used, which corresponds to the specific formula (IV-1) below:
(IV-1)

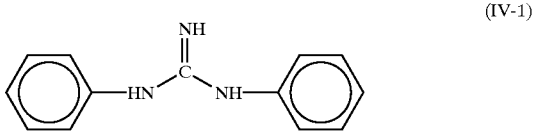

(IV-1)

However, guanidine derivatives other than DPG may also be used, in particular other aromatic guanidine derivatives corresponding to the general formula (IV-2) below:

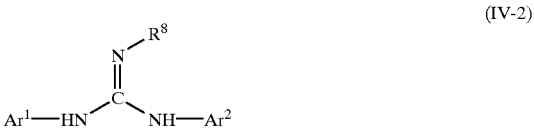

(IV-2)

in which $Ar^1$ and $Ar^2$ each represent a substituted or non-substituted aryl group, preferably a phenyl group, and $R^8$ represents a hydrogen or a hydrocarbon group. Examples of compounds corresponding to formula (IV-2) include triphenylguanidine or alternatively di-o-tolylguanidine, as well as the aforementioned DPG.

In the compositions according to the invention, the quantity of guanidine derivative is preferably between 0.5% and 4%, relative to the weight of reinforcing white filler, more preferably between 1% and 3%, or preferably between 0.25 and 4 phr, more preferably between 0.5 and 2 phr. Below the minimum amounts indicated, the effect of activation risks being inadequate, whereas beyond the maxima indicated generally no further improvement in the coupling is observed, whereas there is a risk of scorching.

Preferably, in the compositions of the invention, the coupling system comprising the polysulphurized alkoxysilane coupling agent and the coupling activator (enamine+guanidine derivative) represents a total of between 1% and 20% relative to the weight of reinforcing white filler, more preferably between 5% and 15%. In the majority of cases, this coupling system has proved of sufficiently high performance, for the requirements of the rubber compositions which are intended for the manufacture of tires, in an amount less than 12%, or even less than 10%, relative to the weight of reinforcing white filler. Amounts of between 5% and 8% are, for example, advantageously possible in the compositions intended for treads for tires for passenger vehicles. Relative to the weight of diene elastomer present in the compositions of the invention, the amount of coupling system according to the invention is preferably between 1 and 12 phr, more preferably between 5 and 10 phr.

II-5. Various Additives

Of course, the rubber compositions according to the invention also contain all or part of the additives usually used in sulphur-cross-linkable diene rubber compositions intended for the manufacture of tires, such as, plasticizers, pigments, antioxidants, antiozonants, a cross-linking system based either on sulphur or on sulphur donors and/or peroxide and/or bismaleimides, vulcanization accelerators, vulcanization activators, extender oils, etc. A conventional non-reinforcing white filler, such as particles of clay, bentonite, talc, chalk, kaolin or titanium oxides, may be associated with the reinforcing white filler.

The compositions according to the invention may also contain, in addition to the polysulphurized alkoxysilanes, covering agents (comprising, for example, the single Y function) for the reinforcing white filler or more generally processing aids liable, in known manner, owing to an improvement in the dispersion of the white filler in the rubber matrix and to a reduction in the viscosity of the compositions, to improve their ability to be worked in the uncured state. These agents include alkylalkoxysilanes (in particular alkyltriethoxysilanes), polyols, polyethers (for example polyethylene glycols), primary, secondary or tertiary amines, hydroxylated or hydrolysable polyorganosiloxanes, for example $\alpha,\omega$-dihydroxy-polyorganosiloxanes (in particular $\alpha,\omega$-dihydroxy-polydimethylsiloxanes). These compositions may also contain coupling agents other than polysulphurized alkoxysilanes.

II-6. Preparation of the Rubber Compositions

The compositions are produced in appropriate mixers, using two successive preparation phases well-known to persons skilled in the art: a first phase of thermomechanical working or kneading (sometimes referred to as "non-productive" phase) at high temperature, up to a maximum temperature of between 130° C. and 200° C., preferably between 145° C. and 185° C., followed by a second phase of mechanical working (sometimes referred to as "productive" phase) at lower temperature, typically less than 120° C., for example between 60° C. and 100° C., during which finishing phase the cross-linking or vulcanization system is incorporated. Such a two phase preparation has been described, for example, in the aforementioned EP-A-0 501 227.

According to a preferred embodiment of the invention, all the base constituents of the compositions according to the invention, namely the reinforcing white filler and the coupling system according to the invention which is formed by the association of the polysulphurized alkoxysilane, the enamine and the guanidine derivative, are incorporated in the diene elastomer during the first, so-called non-productive, phase. In other words, these different base constituents are introduced into the mixer and are kneaded thermomechanically, in one or more stages, until a maximum temperature of between 130° C. and 200° C., preferably between 145° C. and 185° C., is reached.

By way of example, the first (non-productive) phase is carried in a single thermomechanical step during which all the constituents necessary, including the coupling system according to the invention, any additional coating agents or processing agents and various other additives, with the exception of the vulcanization system, are introduced into a suitable mixer, such as a conventional internal mixer. A second stage of thermomechanical working may be added, in this internal mixer, after the mixture has dropped and after intermediate cooling (preferably to a temperature of less than 100° C.), with the aim of making the compositions undergo complementary heat treatment, in order to improve further the dispersion of the reinforcing white filler and its coupling system in the elastomeric matraix.

After the mixture thus obtained has cooled, the vulcanization system is then incorporated at low temperature, generally in an external mixer such as an open mill. The entire composition is then mixed (productive phase) for several minutes, for example between 5 and 15 minutes.

The final composition thus obtained is then calendered for example in the form of a sheet, a plate or alternatively a rubber profiled element which can be used for the manufacture of semi-finished products such as treads.

The vulcanization (or curing) is carried out in known manner at a temperature generally between 130° C. and 200° C., for a sufficient time which may vary, for example, between 5 and 90 minutes, depending on the curing temperature, the vulcanization system adopted and the vulcanization kinetics of the composition in question.

It goes without saying that the invention relates to the rubber compositions previously described, both in the raw state (i.e. before curing) and in the cured state (i.e. after cross-linking or vulcanization).

Of course, the compositions according to the invention may be used alone or in a blend with any other rubber composition which can be used for manufacturing tires.

III. EXAMPLES OF EMBODIMENT OF THE INVENTION

III-1. Preparation of the Rubber Compositions

For the following tests, the procedure is as follows: the diene elastomer or the mixture of diene elastomers, the reinforcing filler, the coupling system according to the invention, then the various other ingredients, with the exception of the vulcanization system, are introduced into an internal mixer filled to 70% of capacity, the initial tank temperature of which is approximately 60° C. Thermomechanical working (non-productive phase) is then performed in one or two stages, depending on the cases (total duration of kneading: 2 to 5 minutes), until a maximum "dropping" temperature of about 165° C. is obtained.

The mixture thus obtained is recovered, it is cooled and then sulphur and sulphenamide are added on an external mixer (homo-finisher) at 30° C., by mixing everything (productive phase) for an appropriate time, of between 5 and 12 minutes depending on the case.

The compositions thus obtained are then calendered either in the form of sheets (thickness of 2 to 3 mm) or of thin films of rubber in order to measure their physical or mechanical properties, or in the form of profiled elements which can be used directly, after cutting out and/or assembly to the dimensions desired, for example as semi-finished products for tires, in particular as treads.

In the following tests, the reinforcing white filler (silica or silica/alumina blend) constitutes the entire reinforcing filler, but it goes without saying that a fraction of the latter, preferably a minority fraction, could be replaced by carbon black.

III-2. Tests

A) Test 1

In this first test, two rubber compositions (mixture of SBR and BR diene elastomers) reinforced with silica which are intended for the manufacture of tires or treads for tires are compared. The SBR elastomer is prepared in solution, and contains 26.5% styrene, 59.5% 1-2-polybutadiene units and 23% trans-1-4-polybutadiene units; the BR elastomer comprises 93% of 1-4 cis units.

These two compositions are identical except for the following differences:

Composition No. 1: TESPT (6.4 phr);
Composition No. 2: TESPT (6.4 phr), with which there is associated the enamine of formula III-0 (0.5 phr, or 7.8% relative to the weight of TESPT).

Each composition further comprises 1.5 phr of guanidine derivative (or about 1.9% relative to the weight of reinforcing white filler). Composition No. 1 is the control for this test, and contains an amount of TESPT of 8% relative to the weight of reinforcing white filler (6.4 phr of TESPT per 80 phr of silica), but is devoid of enamine. In Composition No. 2 according to the invention, the quantity of alkoxysilane and enamine represents less than 10% (precisely, 8.6%) relative to the weight of reinforcing white filler. The coupling system according to the invention (TESPT+enarnine+DPG) is advantageously present in an amount of less than 12% relative to the weight of reinforcing white filler.

Tables 1 and 2 show the formulation of the different compositions (Table 1—amount of the different products expressed in phr), and their properties before and after curing (40 min at 150° C.). FIG. 1 shows the curves of modulus (in MPa) as a function of the elongation (in %); these curves are marked C1 to C2, and correspond to Compositions Nos. 1 and 2 respectively.

The results set forth in Table 2 show that Composition No. 2 according to the invention, compared with the control Composition No. 1, has in the uncured state a Mooney viscosity which is little different (hence equivalent processing properties), a scorching time which admittedly is shorter but satisfactory, and substantially improved properties in the cured state:

higher moduli at the high deformations (M100 and M300), ratio M300/M100 also higher (in a manner known to persons skilled in the art, indicating greater reinforcement);
lower hysteresis losses (HL);
a higher breaking stress.

The attached FIG. 1 confirms the preceding observations: for elongations of 100% and more, all the values of modulus are greater in the case of Composition No. 2 (curve C2); for such a range of elongations, such behavior illustrates a better interaction between the reinforcing white filler and the elastomer.

In summary, all the results obtained after curing are representative of better coupling between the reinforcing white filler and the diene elastomer, i.e., activation by the enamine and the guanidine derivative of the coupling function of the polysulphurized alkoxysilane.

B) Test 2

The object of this test is to show that it is possible, owing to the activation provided by the enamine, to greatly reduce the quantity of polysulphurized alkoxysilane, in particular TESPT, without adversely affecting the properties of reinforcement of the compositions by the white filler.

Four rubber compositions (SBR and BR blend) which are similar to those of Test 1 above, these compositions being identical apart from the following differences, are compared:

Composition No. 3: TESPT (6.4 phr);
Composition No. 4: TESPT (4 phr);
Composition No. 5: TESPT (4 phr) plus enarnine of formula III-0 (0.5 phr, or 12.5% relative to the weight of TESPT);
Composition No. 6: TESPT (4.8 phr) plus enamine of formula III-0 (0.25 phr, or 5.2% relative to the weight of TESPT).

Figure 2:
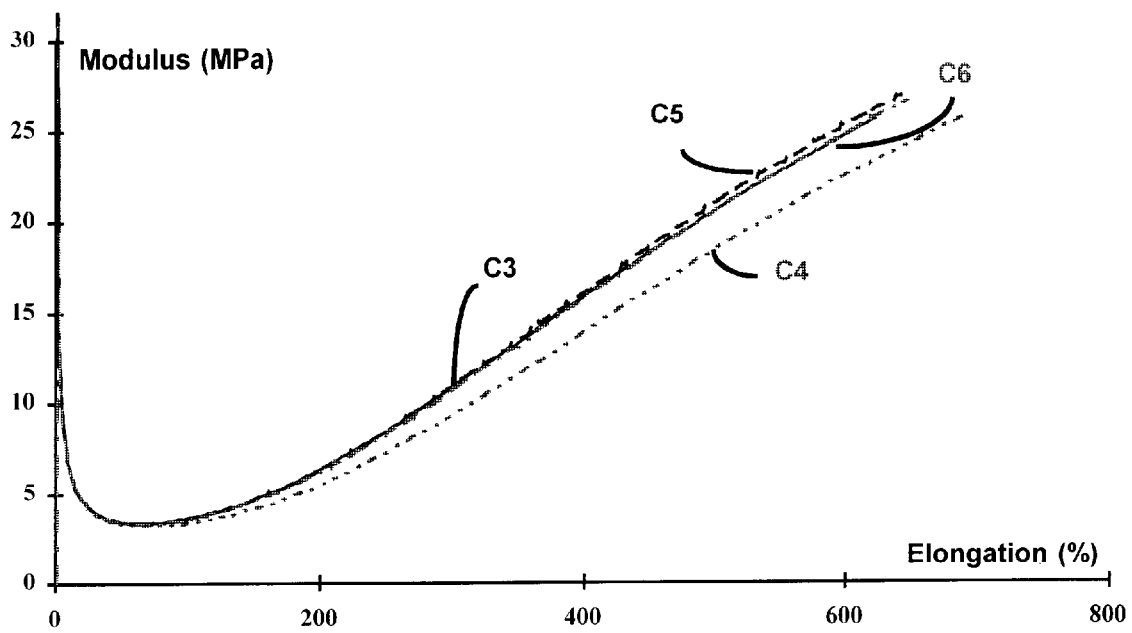
FIG. 2 is a graph showing the curves of variation of the modulus as a function of elongation ($C_3$–$C_6$) for the diene rubber compositions of Test 2.

Each composition furthermore comprises 1.5 phr of guanidine derivative. Compositions No. 5 and No. 6 are therefore in accordance with the invention; Composition No. 3 is the reference composition of the prior art and Composition No. 4 represents a control having an identical amount of TESPT compared with Composition No. 5. Tables 3 and 4 show the formulation of the different compositions, and their properties before and after curing (150° C., 40 minutes). FIG. 2 shows the curves of modulus (in MPa) as a function of the elongation (in %); these curves are marked C3 to C6, and correspond to rubber Compositions Nos. 3 to 6, respectively.

In Composition No. 3 according to the prior art, it will be noted that the amount of TESPT represents 8% relative to the weight of silica, which is greater by 60% than the amount of TESPT used in Composition No. 5 and by more than 30% than that used in Composition No. 6, both being in accordance with the invention.

In the compositions according to the invention the quantity of polysulphurized alkoxysilane represents less than 8% (precisely, 6% for Composition No. 6), more preferably less than 6% (precisely, 5% for Composition No. 5) relative to the weight of reinforcing white filler. In the two compositions according to the invention, the total quantity of (TESPT+enamine) advantageously represents less than 8% (6.3% for Composition No. 6), more advantageously still less than 6% (5.6% for Composition No. 5) relative to the weight of reinforcing white filler. The amount of the coupling system itself (TESPT+enamine+DPG) remains less than 10% (8.2% for Composition No. 6), and more advantageously still less than 8% (7.5% for Composition No. 5), relative to the weight of reinforcing white filler.

A study of the different results shows that Compositions No. 5 and No. 6 according to the invention, compared first with the reference Composition No. 3, have performances after curing which are equivalent despite a substantially lower amount of TESPT and, second with the control Composition No. 4 which contains the same quantity 5 of TESPT but is devoid of enamine, have overall higher performances:

moduli at the high deformations (M100 and M300) and ratio M300/M100 substantially identical to those of the reference Composition No. 3, and significantly greater than those of the control Composition No. 4;
hysteresis losses (HL) substantially identical;
equivalent properties at break.

The appended FIG. 2 confirms the effect of activation of coupling provided by the enamine and the diphenylguanidine. It can clearly be seen that the values of modulus, for elongations of 100% and more, are substantially identical for Compositions No. 3, No. 5 and No. 6 (curves $C_3$, $C_5$ and $C_6$ virtually overlapping) and clearly greater than those observed on the control Composition No. 4 ($C_4$).

It is thus possible to very substantially reduce (from 6.4 phr to 4 phr) the quantity of TESPT in the rubber compositions according to the invention, while keeping the reinforcement properties at a substantially identical level.

Although the reduction in the amount of silane, as expected, involves an increase in the viscosity in the uncured state and a very slight reduction in the scorching time, the variations observed remain quite acceptable.

In particular, the person skilled in the art will be able to correct, if necessary, the increase in viscosity in the uncured state by the addition of a small quantity of covering agent.

Complementary tests have for example been carried out which show that the addition of 2.4 phr of a coating agent such as 1-octyl-triethoxysilane (product sold by Hüils under the name Dynasylan Octeo) to the composition according to the invention No. 5 makes it possible to reduce the Mooney viscosity to a value of 78 MU, the modulus M10 to 4.4 MPa (another indicator of better coating of the silica), with in addition a better hysteresis (2.5 points less on HL), without the reinforcement properties being modified (M100, M300, M300/M100 and breaking stress identical).

C) Test 3

This test shows that it is possible, owing to the activation provided by the enamine and the guanidine derivative, to replace a tetrasulphurized alkoxysilane (TESPT) with a disulphurised alkoxysilane (TESPD), which is known to be less active than the former, practically without adversely affecting the properties of the rubber compositions.

Three rubber compositions similar to those of Tests 1 and 2 above are compared, these three compositions being identical except for the following differences:

Composition No. 7: TESPT (6.4 phr);
Composition No. 8: TESPD (5.6 phr);
Composition No. 9: TESPD (5.6 phr) plus enamine of formula III-0 (0.5 phr, or 8.9% relative to the weight of TESPD).

Each composition further comprises 1.5 phr of guanidine derivative. Composition No. 7 is the control for this test (8% of TESPT relative to the weight of reinforcing white filler); Composition No. 8, which is also not in accordance with the invention, contains the TESPD in an isomolar amount relative to the amount of TESPT. Thus, for the two Compositions No. 7 and No. 8, the same amount of triethoxysilane functions reactive in relation to the silica and to its hydroxyl surface groups is used. Composition No. 9 is the only composition according to the invention. The amount of alkoxysilane in Composition No. 9 represents less than 8% (precisely, 7%) relative to the weight of silica (80 phr), the quantity (TESPD+enamine) represents less than 8% (precisely, 7.6%) relative to this same weight. The coupling system according to the invention (here, TESPD+enamine+DPG), represents an amount less than 10% (precisely 9.5%) relative to the weight of reinforcing white filler.

Figure 3:
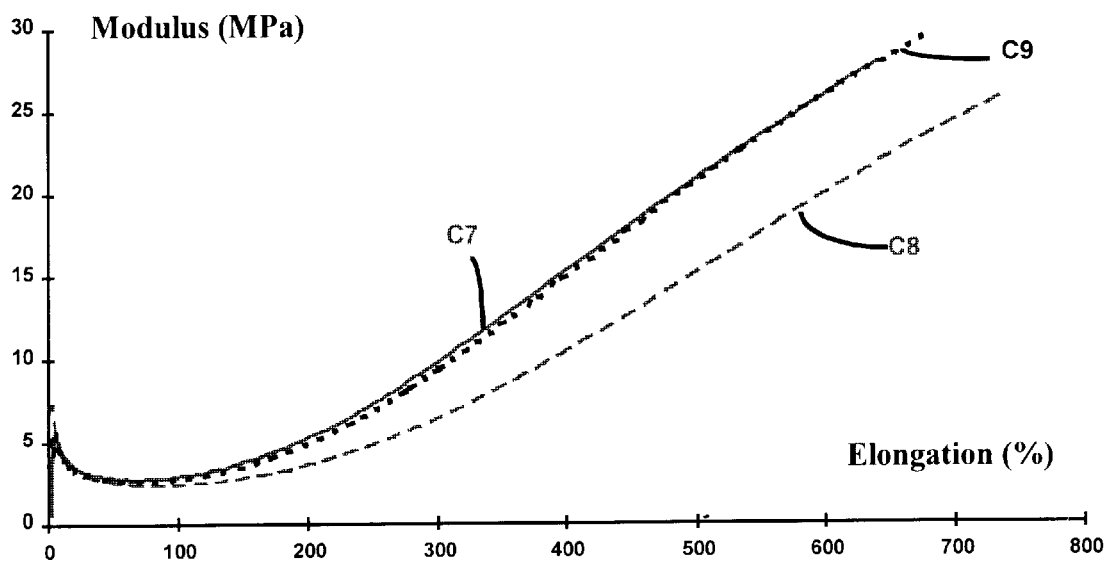
FIG. 3 is a graph showing the curves of variation of the modulus as a function of elongation ($C_7$–$C_9$) for the diene rubber compositions of Test 3.

Tables 5 and 6 show the formulation of the different compositions, and their properties before and after curing (150° C., 40 minutes). FIG. 3 shows the curves of modulus (in MPa) as a function of the elongation (in %), with the curves marked $C_7$ and $C_9$ corresponding to Compositions No. 7 to No. 9, respectively.

It will be noted that Composition No. 8, compared with Composition No. 7, has reinforcement properties after curing (M100, M300 and ratio M300/M100) which are substantially lower, a lesser breaking strength, as well as greater hysteresis losses. All this is due to the lesser effectiveness of coupling (white filler/diene elastomer) of the disulphurized alkoxysilane compared to the tetrasulphurized alkoxysilane.

However, owing to the addition of a small quantity of enamine to Composition No. 9, a very substantial increase in the reinforcement properties (M100, M300, M300/M100, breaking stress) and a drop in the HL can be observed. These properties are reduced practically to the same levels as those observed on Composition No. 7. This effectiveness of the enamine combined with the guanidine derivative, as coupling activator for the TESPD, is also clearly illustrated by the curves of FIG. 3 (curves $C_7$ and $C_9$ virtually overlapping and located, for elongations greater than 100%, well beyond curve $C_8$).

D) Test 4

In this test, three rubber compositions (mixture of SBR and BR diene elastomers) similar to those of the preceding tests, which are intended for the manufacture of tires or treads for tires, are prepared.

These three compositions are identical except for the following differences:

Composition No. 10: TESPT (6.4 phr);
Composition No. 11: TESPT (6.4 phr) with which is associated the enamine of formula III-1 (0.5 phr, or 7.8% relative to the weight of TESPT);
Composition No. 12: TESPT (6.4 phr) with which is associated the enamine of formula III-2 (0.55 phr, or 8.6% relative to the weight of TESPT).

Each composition further comprises 1.5 phr of guanidine derivative. Composition No. 10 is the control for this test and contains an amount of TESPT of 8% relative to the weight of reinforcing white filler (6.4 phr of TESPT per 80 phr of silica), but is devoid of enamine. Compositions No. 11 and No. 12, which are in accordance with the invention, contain the coupling system according to the invention (TESPT+enamine+DPG) in an amount less than 12% relative to the weight of reinforcing white filler. For these compositions, the quantity (TESPT+enamine) represents less than 10% relative to the weight of reinforcing white filler.

Figure 4:
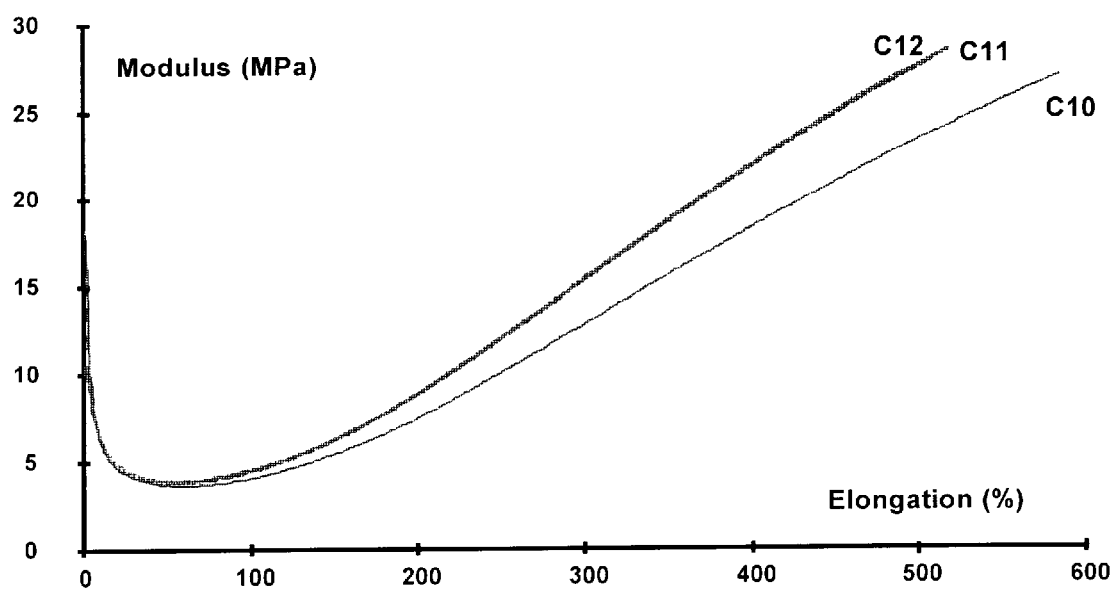
FIG. 4 is a graph showing the curves of variation of the modulus as a function of elongation ($C_{10}$–$C_{12}$) for the diene rubber compositions of Test 4.

Tables 7 and 8 show the formulation of the different compositions (Table 7—amount of the different products expressed in phr), and their properties before and after curing (40 min at 150° C.). FIG. 4 shows the curves of modulus (in MPa) as a function of the elongation (in %). These curves are marked $C_{10}$, $C_{11}$ and $C_{12}$ and correspond to Compositions No. 10, No. 11 and No. 12 respectively.

The results set forth in Table 8 show that Compositions No. 11 and No. 12 according to the invention, compared with the control Composition No. 10, have in the uncured state a Mooney viscosity which is little different (hence equivalent processing properties), but substantially improved properties in the cured state:

higher moduli at the high deformations (M100 and M300), ratio M300/M100 also higher (in a manner known to the person skilled in the art, indicating better reinforcement);
slightly lower hysteresis losses (HL):
a higher breaking stress.

The attached FIG. 4 confirms the preceding observations. For elongations of 100% and more, all the values of modulus are greater in the case of Compositions No. 11 and No. 12 (curves $C_{11}$ and $C_{12}$ virtually overlapping), which illustrates a better interaction between the reinforcing white filler and the elastomer.

E) Test 5

The object of this test, which is similar to Test 2 above, but in the presence of different enamines, is to confirm that as a result of the activation provided by the enamine and the guanidine derivative, it is possible to greatly reduce the quantity of polysulphurized alkoxysilane, in particular TESPT, without adversely affecting the properties of reinforcement of the compositions by the white filler.

Four rubber compositions similar to those of the tests above are compared, these four compositions being identical except for the following differences:

Composition No. 13: TESPT (6.4 phr);
Composition No. 14: TESPT (4 phr);
Composition No. 15: TESPT (4 phr) plus enamine of formula III-1 (0.5 phr, or 12.5% relative to the weight of TESPT);

Composition No. 16: TESPT (4 phr) plus enamine of formula III-2 (0.55 phr, or 13.75% relative to the weight of TESPT).

Figure 5:
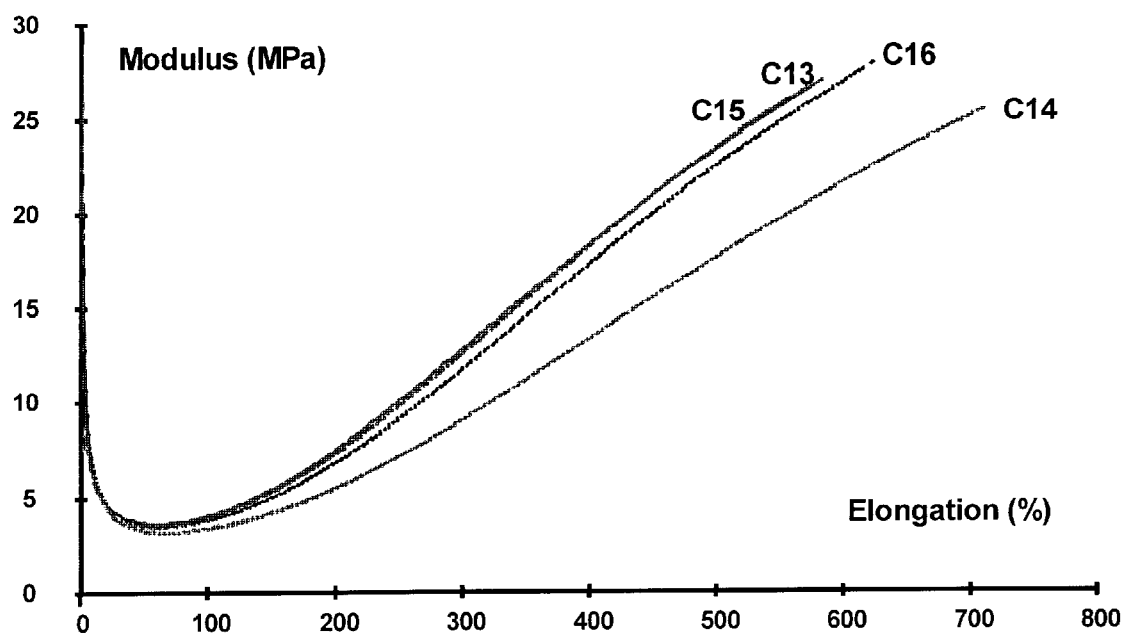
FIG. 5 is a graph showing the curves of variation of the modulus as a function of elongation ($C_{13}$–$C_{16}$) for the diene rubber compositions of Test 5.

Each composition further comprises 1.5 phr of guanidine derivative. Only Compositions No. 15 and No. 16 are therefore in accordance with the invention; Composition No. 13 is the reference composition of the prior art and Composition No. 14 represents a control with an identical amount of TESPT relative to Compositions No. 15 and No. 16. Tables 9 and 10 show the formulation of the different compositions and their properties before and after curing (150° C., 40 minutes). FIG. 5 shows the curves of modulus (in MPa) as a function of the elongation (in %). These curves are marked $C_{13}$ and $C_{16}$, and correspond to rubber Compositions Nos. 13 to 16, respectively.

In Composition No. 13 in accordance with the prior art, it will be noted that the amount of TESPT represents 8% relative to the weight of silica, which is greater by 60% than the amount of TESPT used in Compositions No. 15 and No. 16, both of which are in accordance with the invention. In compositions No. 15 and No. 16, the quantity of polysulphurized alkoxysilane represents advantageously less than 6% (precisely, 5%) and the total quantity (TESPT+enamine) less than 6% (5.6% for composition No. 15 and 5.7% for Composition No. 16) relative to the weight of reinforcing white filler. As for the coupling system itself (TESPT+enamine+DPG), the amount thereof remains advantageously less than 8% (7.5% for Composition No. 15 and 7.6% for Composition No. 16), relative to the weight of reinforcing white filler.

The test results show that Compositions No. 15 and No. 16 according to the invention, compared first with the reference Composition No. 13, have performances, after curing, which are very close despite a substantially lower amount of TESPT and second with the control Composition No. 14, which contains the same quantity of TESPT, have overall higher performances:

- moduli at the high deformations (M100 and M300) and ratio M300/M100 substantially identical to those of the reference composition No. 13, and significantly greater than those of the control Composition No. 14;
- hysteresis losses (HL) very close to those of Composition No. 13, and lower than those of Composition No. 14;
- equivalent properties at break.

The appended FIG. 5 confirms the effect of activation of coupling provided by the enamine and the guanidine derivative. It can clearly be seen that the values of modulus, for elongations of 100% and more, are substantially identical for Compositions No. 13, No. 15 and No. 16 (curves $C_{13}$, $C_{15}$ and $C_{16}$ virtually overlapping) and substantially greater than those observed on the control Composition No. 14.

Thus it is possible to very substantially reduce (from 6.4 phr to 4 phr) the quantity of TESPT in the rubber compositions according to the invention, while keeping the reinforcement properties at a substantially identical level.

Although the reduction in the amount of silane, as expected, involves an increase in the viscosity in the uncured state, the variations observed remain acceptable. As indicated above, persons skilled in the art will be able to correct, if necessary, the increase in viscosity in the uncured state by the addition of a small quantity of covering agent. Complementary tests were carried out which show, for example, that the addition of 1.5 phr of a covering agent, such as α,ω-dihydroxy-polydimethylsiloxane (product sold by ABCR under the name PS340), to the composition according to the invention No. 15 makes it possible to lower the Mooney viscosity to a value of 95 MU, the modulus M10 to 5.35 MPa (another indicator of better covering of the silica), with a better hysteresis (2 points less on HL), without the reinforcement properties being modified (M100, M300, M300/M100 and breaking stress identical).

F) Test 6

The object of this test, which is similar to Test 3 above, is to confirm, in the presence of another enamine, that the activation provided by the enamine and the guanidine derivative makes it possible to replace a tetrasulphurized alkoxysilane (TESPT) with a disulphurized alkoxysilane (TESPD), which is known to be less active than the former, without adversely affecting the properties of the rubber compositions.

For this, two rubber compositions similar to those of the tests above are compared, these two compositions being identical except for the following differences:

Composition No. 17: TESPD (5.6 phr);
Composition No. 18: TESPD (5.6 phr) plus enamine of formula III-1 (0.5 phr, or 8.9% relative to the weight of TESPD).

The two compositions contain 1.5 phr of guanidine derivative. Composition No. 17, which is not in accordance with the invention, contains the TESPD in an isomolar amount relative to the amount of TESPT of 6.4 phr used in the majority of the control compositions above. In other words, the same amount of triethoxysilane functions reactive in relation to the silica and to its hydroxyl surface groups is used. Relative to the weight of reinforcing white filler, Composition No. 18 according to the invention comprises (% by weight) less than 8% (precisely, 7%) of TESPD, less than 8% (precisely, 7.6%) of (TESPD+enamine), and less than 10% (precisely, 9.5%) of (TESPD+enamine+DPG).

Figure 6:
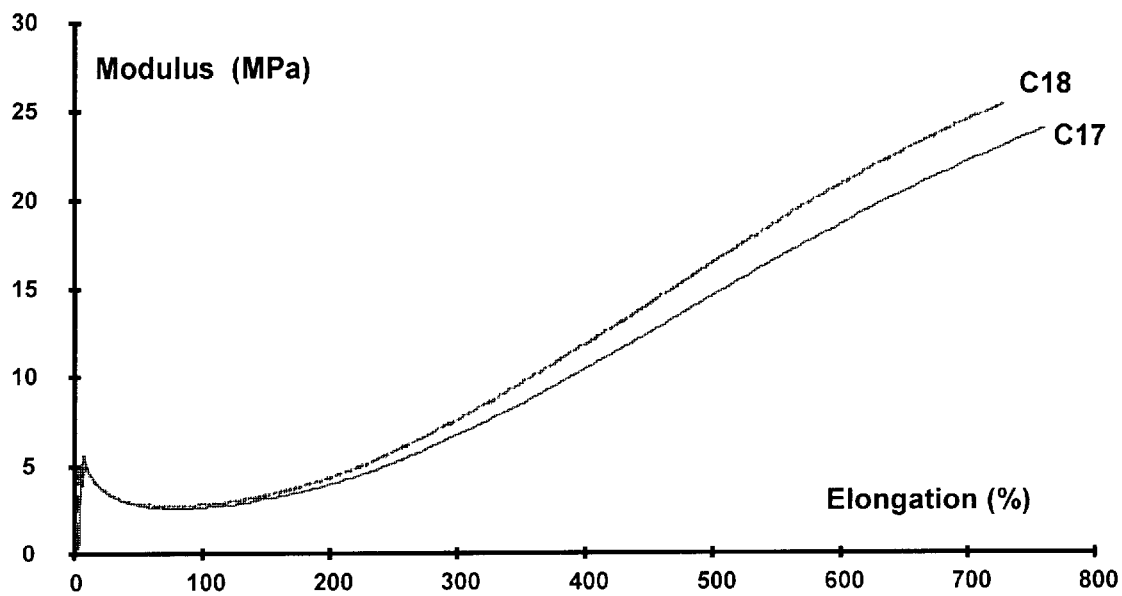
FIG. 6 is a graph showing the curves of variation of the modulus as a function of elongation ($C_{17}$–$C_{18}$) for the diene rubber compositions of Test 6.

Tables 11 and 12 show the formulation of the different compositions and their properties before and after curing (150° C., 40 minutes). FIG. 6 shows the curves of modulus (in MPa) as a function of the elongation (in %). The curves marked $C_{17}$ and $C_{18}$ correspond to Compositions No. 17 and No. 18, respectively.

It will be noted that the addition of a small quantity of enamine (only 0.5 phr) to Composition No. 18, produces an increase in the reinforcement properties (higher M100, M300, M300/M100, breaking stress) and a lowering of the losses HL relative to Composition No. 17. The activation of coupling provided by the enamine combined with the guanidine derivative is also clearly illustrated by the curves of FIG. 6 (curve $C_{18}$ located, for elongations greater than 100%, beyond curve $C_{17}$).

G) Test 7

The object of this test is to show that the invention applies to polysulphurized alkoxysilanes other than the symmetrical polysulphurized alkoxysilanes used in the tests above.

Two rubber compositions which are identical, apart from the following differences, are prepared:

Composition No. 19: silane of formula II (6.4 phr);
Composition No. 20: silane of formula II (6.4 phr) with which is associated the enamine of formula III-0 (0.5 phr, or 7.8% relative to the weight of alkoxysilane).

Each composition contains 1.5 phr of guanidine derivative. Composition No. 19 is the control for this test, and contains an amount of silane of 8% relative to the weight of reinforcing white filler (6.4 phr per 80 phr of silica), but is devoid of enamine. Composition No. 20, which is in accordance with the invention, comprises the coupling system according to the invention (silane+enamine+guanidine derivative) in an amount less than 12% (precisely, 10.5%) relative to the weight of reinforcing white filler.

Figure 7:
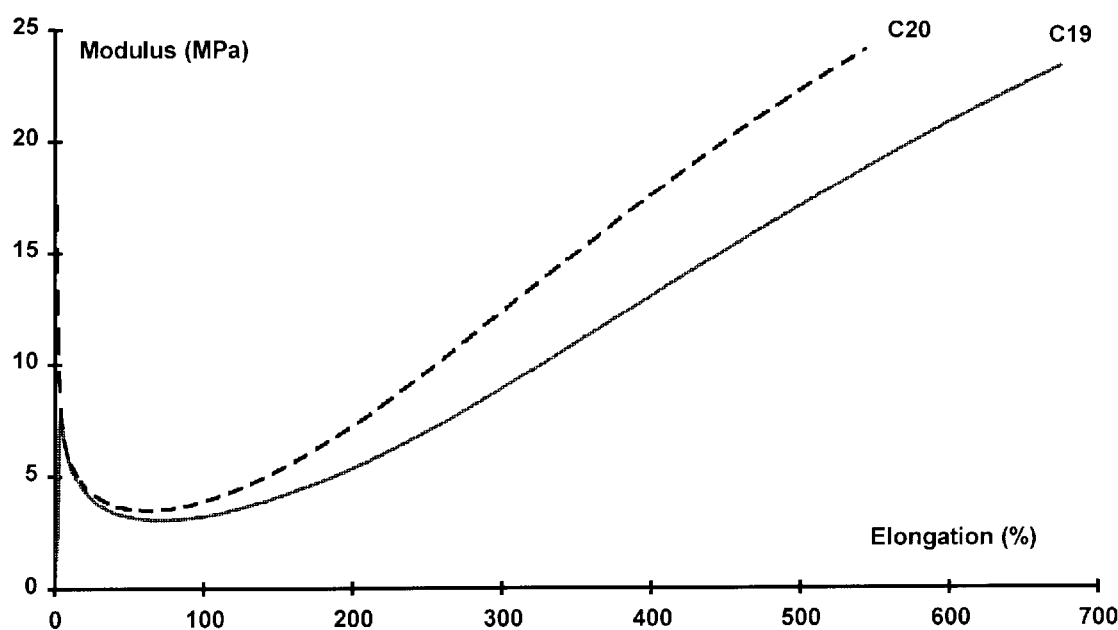
FIG. 7 is a graph showing the curves of variation of the modulus as a function of elongation ($C_{19}$–$C_{20}$) for the diene rubber compositions of Test 7.
Figure 8:
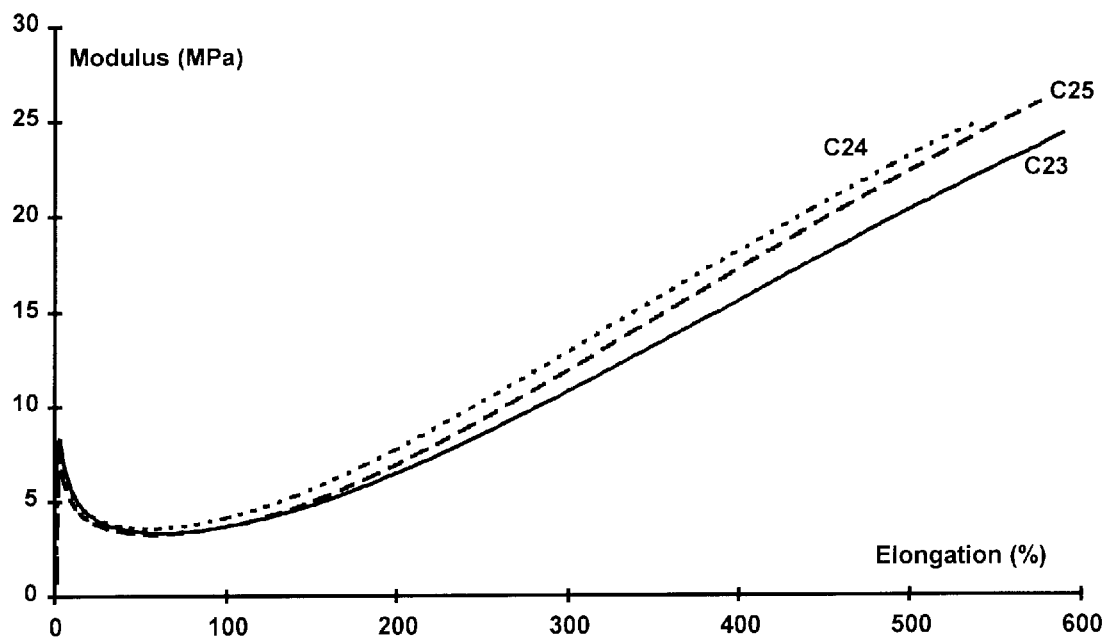
FIG. 8 is a graph showing the curves of variation of the modulus as a function of elongation ($C_{23}$–$C_{25}$) for the diene rubber compositions of Test 9.

Tables 13 and 14 show the formulation of the different compositions, and their properties before and after curing (40 min at 150° C.). FIG. 7 shows the curves of modulus (in MPa) as a function of the elongation (in %). These curves marked $C_{19}$ and $C_{20}$ correspond to Compositions Nos. 19 and 20, respectively.

The results set forth in Table 14 show that Composition No. 20 according to the invention, compared with the control Composition No. 19, has in the uncured state an identical Mooney viscosity (hence equivalent processing properties), a scorching time which admittedly is shorter but satisfactory, and substantially improved properties in the cured state:

higher moduli at the high deformations (M100 and M300), ratio M300/M100 also higher (therefore better reinforcement);

lower hysteresis losses (HL);

with an identical breaking stress.

FIG. 7 confirms the results above: for elongations of 100% and more, the values of modulus are distinctly better in the case of Composition No. 20 (curve $C_{20}$), which clearly illustrates a better interaction between the reinforcing white filler and the elastomer.

H) Test 8

Two rubber compositions similar to those previously tested are prepared, with the reinforcing filler being constituted by a (50/50) mixture of reinforcing silica and alumina. The alumina is an alumina such as described in the aforementioned application EP-A-0 810 258.

These two compositions are identical except for the following differences:

Composition No. 21: TESPT (6.5 phr);

Composition No. 22: TESPT (6.5 phr), with which there is associated the enamine of formula III-0 (0.5 phr, or 7.7% relative to the weight of TESPT).

Each composition further comprises 0.9 phr of diphenylguanidine (or about 0.9% relative to the weight of reinforcing white filler). Composition No. 21 is the control for this test, and contains an amount of silane of approximately 6.6% relative to the weight of reinforcing white filler (6.5 phr of silane relative to 99 phr of reinforcing white filler), but it is devoid of enamine. Composition No. 22, which is in accordance with the invention, comprises the coupling system according to the invention (TESPT+ enamine+DPG) in an amount advantageously less than 8% (precisely, 7.9%) relative to the weight of total reinforcing white filler.

Tables 15 and 16 show the formulation of the different compositions, and their properties before and after curing (40 min at 150° C.).

The results set forth in Table 16 show comparable properties in the uncured state (hence equivalent processing properties). In the cured state there are substantially improved properties for Composition No. 22 according to the invention: higher moduli M100 and M300, higher ratio M300/M100, slightly lower hysteresis losses (HL), higher breaking stress.

I) Test 9

Three compositions similar to those of the previous test are prepared, the reinforcing filler comprising a mixture (70/30 blend) of silica and alumina. The alumina used here is a reinforcing alumina such as described in application EP-A-0 810 258. Two different enamines are tested.

These three compositions are identical except for the following differences:

Composition No. 23: TESPT (6 phr);

Composition No. 24: TESPT (6 phr) with which is associated the enamine of formula III-0 (0.5 phr, or 8.3% relative to the weight of TESPT);

Composition No. 25: TESPT (6 phr) with which is associated the enamine of formula III-2 (0.55 phr, or 9.2% relative to the weight of TESPT).

Each composition further comprises 1.2 phr of guanidine derivative. Composition No. 23 is the control for this test and contains an amount of TESPT of 6.8% relative to the weight of reinforcing white filler (6 phr of TESPT per 88 phr of reinforcing white filler), but is devoid of enamine. Compositions No. 24 and No. 25, according to the invention, comprise a coupling system according to the invention (TESPT+enamine+DPG) in an amount of less than 10% (about 8.8%) relative to the weight of total reinforcing white filler.

Tables 17 and 18 show the formulation of the different compositions, and their properties before and after curing (40 min at 150° C.).

The results set forth in Table 18 show that the compositions according to the invention (Nos. 24 and 25), compared with the control composition, have equivalent viscosities (and therefore processing properties) in the uncured state, improved properties in the cured state: higher moduli M100 and M300, higher ratios M300/M100, lower losses (HL). This illustrates a better interaction between the reinforcing white filler and the elastomer, confirmed by the curves of FIG. 8 (curves $C_{24}$ and $C_{25}$ located above the control curve $C_{23}$).

J) Test 10

This test shows that the presence of a guanidine derivative is an essential characteristic in the coupling system according to the invention.

Three rubber compositions which are identical, apart from the following differences, are compared:

Composition No. 26: TESPT (6.4 phr) with guanidine derivative but without enamine;

Composition No. 27: TESPT (6.4 phr) plus enamine of formula III-0 (0.5 phr, or 7.8% relative to the weight of TESPT) with which there is associated a guanidine derivative (1.5 phr);

Composition No. 28: TESPT (6.4 phr) with enamine but without guanidine derivative.

Only Composition No. 27 is therefore in accordance with the invention; Composition No. 26 is the control for this test. Tables 19 and 20 show the formulation of the different compositions, and their properties before and after curing (150° C., 40 minutes).

The different results show that Composition No. 27 according to the invention, compared with the control Composition No. 26, has in the uncured state a Mooney viscosity which is little different, a scorching time which admittedly is shorter but satisfactory, and improved properties in the cured state, i.e., significantly higher moduli M100 and M300, higher ratio M300/M100, lower losses (HL).

In Composition No. 28, which is devoid of guanidine derivative, these properties are degraded compared with those of the composition of the invention, both in the uncured state and after curing (higher viscosity, greater losses HL, lower level of reinforcement according to the values M100, M300 and ratio M300/M100). Clearly, in the absence of guanidine derivative, the enamine has no effect on the coupling agent.

K) Test 11

This test shows that it is preferable, when manufacturing the compositions of the invention, to incorporate the guanidine derivative with the elastomer, the reinforcing white filler and the rest of the coupling system (polysulphurized alkoxysilane and enamine), during the first phase of thermomechanical working (non-productive phase), and not later with the vulcanization system (productive phase).

Three rubber compositions which are identical, apart from the following differences, are prepared:

Composition No. 29: TESPT (6.4 phr) with guanidine derivative but without enamine;

Compositions No. 30 and No. 31: TESPT (6.4 phr) plus enamine of formula III-2 (0.55 phr, or 8.6% relative to the weight of TESPT) with which there is associated a guanidine derivative.

Compositions No. 30 and No. 31 are therefore in accordance with the invention; Composition No. 29 is the control for this test. For compositions No. 29 and No. 30, the guanidine derivative was incorporated in the composition with the reinforcing white filler and the rest of the coupling system according to the invention, that is to say in the internal mixer (non-productive phase). For Composition No. 31, the guanidine derivative was incorporated with the vulcanization system (sulphur and sulphenamide), that is to say in the external mixer (productive phase).

Figure 9:
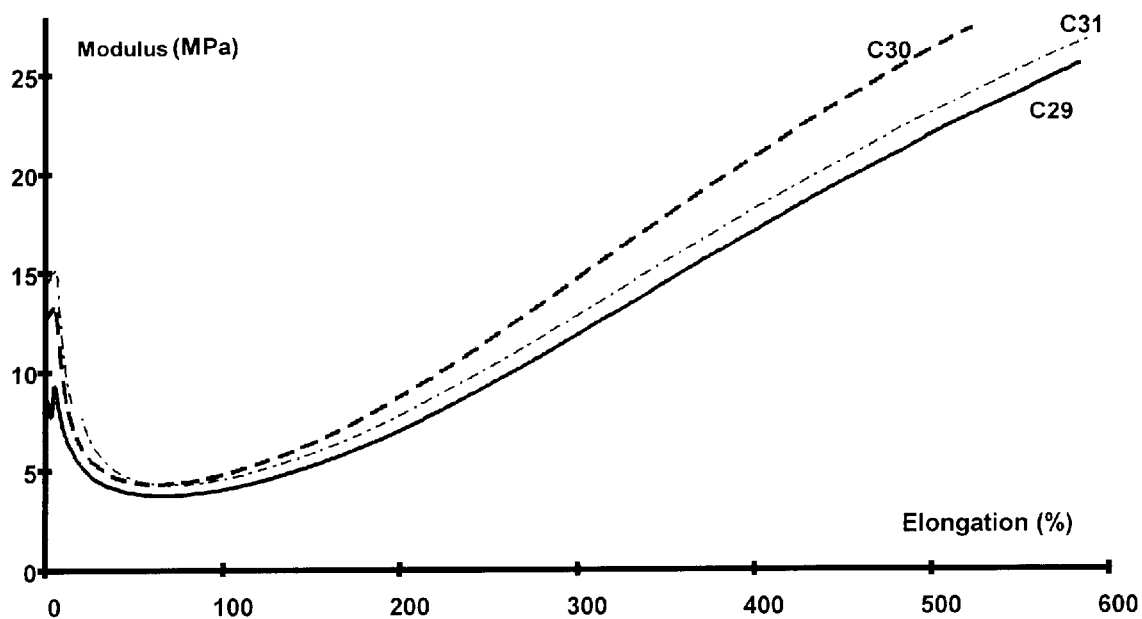
FIG. 9 is a graph showing the curves of variation of the modulus as a function of elongation ($C_{29}$–$C_{30}$) for the diene rubber compositions of Test 11.

Tables 21 and 22 show the formulation of the different compositions, and their properties before and after curing (150° C., 40 minutes). FIG. 9 shows the curves of modulus (in MPa) as a function of the elongation (in %). These curves are marked $C_{29}$ to $C_{31}$ and correspond to rubber Compositions Nos. 29 to 31, respectively.

The results show once more the unexpected effects of the invention: Composition No. 30 according to the invention, compared with the control Composition No. 29, has in the uncured state a Mooney viscosity which, although slightly higher, is satisfactory, and improved properties in the cured state, i.e., higher moduli M100 and M300 and ratio M300/M100, lower losses (HL), higher breaking stress. FIG. 9 confirms the effect of activation of coupling provided by the enamine and the diphenylguanidine. For elongations of 100% and more, values of modulus are recorded which are significantly higher in the case of Composition No. 30 according to the invention (curve $C_{30}$), compared with the control composition (curve $C_{29}$).

It will be noted for Composition No. 31 that these reinforcement properties (see M100 and M300) are also substantially improved relative to the control Composition No. 29, while being lower than those of the composition according to the invention No. 30 (curve $C_{31}$ located in FIG. 9 between the curves $C_{29}$ and $C_{30}$).

L) Test 12

The invention is illustrated here by running tests on radial-carcass tires of dimension 175/70 R14, which are manufactured in known manner and which are identical in all points except for the constitution of the rubber composition constituting the tread which is given in Table 23.

The reinforcing white filler is a highly dispersible silica. The coupling (white filler/diene elastomer) is ensured by 8% TESPT in the case of the control Composition No. 32, by only 5% of TESPT in the case of the Composition No. 33 according to the invention (% by weight relative to the weight of reinforcing white filler), namely a reduction of close to 40% in the quantity of polysulphurized alkoxysilane.

In the composition according to the invention, the 5% TESPT is activated by an enamine of formula III-0 (0.5 phr, or 12.5% relative to the weight of polysulphurized alkoxysilane) in combination with a guanidine derivative (1.5 phr). The quantity of alkoxysilane and of enamine advantageously represents less than 6% (precisely, 5.6%) relative to the weight of reinforcing white filler. As for the coupling system according to the invention (TESPT+enamine+DPG), the amount thereof advantageously represents less than 8% (precisely, 7.5%) relative to the weight of reinforcing white filler.

The tires thus prepared are subjected to on-road travel on a vehicle of the marque Citroen ZX (break type), until the wear due to running reaches the wear indicators located in the grooves of the tread. In a manner known to persons skilled in the art, the wear resistance of the rubber composition, during travel of the tire, is directly correlated to the quality of the reinforcement supplied by the reinforcing filler, that is to say to the amount of coupling (filler/elastomer) obtained. In other words, measurement of the wear resistance is an excellent indicator, if not the best, of the performance of the coupling system used, since it is evaluated on the final manufactured product.

It is noted after travel that the tire having the tread in accordance with the invention exhibits a performance which is identical to that of the control tire, covering substantially the same mileage. This equivalent wear resistance, despite a greatly reduced amount of coupling agent, was able to be obtained owing to the strong activation of the coupling provided by the enamine and guanidine derivative compounds in combination.

M) Test 13

The object of this test is to confirm the result of Test 12 above in the presence of a polysulphurized alkoxysilane other than TESPT. Radial-carcass tires of dimension 175/70 R14 which are identical in all points except for the constitution of the rubber composition constituting the tread, which is given in Table 24, are manufactured (control Composition No. 34, Composition No. 35 according to the invention).

The coupling (white filler/diene elastomer) is ensured in both cases by 8% of polysulphurized alkoxysilane of formula II (% by weight relative to the quantity of reinforcing white filler). In Composition No. 35 according to the invention, the 8% silane is activated by 0.5 phr of enamine (or 12.5% of enamine relative to the weight of polysulphurized alkoxysilane) and 1.5 phr of guanidine derivative. In this composition, the total quantity (TESPT+enamine) represents less than 10% (precisely, 8.6%) and the amount of coupling system (TESPD+enamine+DPG) according to the invention represents less than 12% (precisely, 10.5%) relative to the weight of reinforcing white filler (80 phr).

The procedure is as in the preceding test, by subjecting the tires to on-road travel, on a vehicle of the marque Citroen Xsara. At the end of the test, a gain of 4% in wear resistance is noted for the tire according to the invention, without adversely affecting the other running performances.

N) Test 14

Another running test is performed starting with radial-carcass tires (175/70 R14), which are identical in all points except for the constitution of the rubber composition constituting the tread which is given in Table 25 (control Composition No. 36, Composition No. 37 according to the invention).

The coupling (white filler/diene elastomer) is ensured by 8% TESPT in the case of the control Composition No. 36 and by only 6% of TESPT in the case of the Composition according to the invention No. 37 (% by weight relative to the quantity of reinforcing white filler). This represents a reduction of nearly 25% in the quantity of polysulphurized alkoxysilane for Composition No. 37 according to the invention. The 6% TESPT is activated by only 0.3 phr of enamine (or 6.3% of enamine relative to the weight of alkoxysilane) combined with 1.5 phr of DPG. In the composition of the invention, the total quantity (TESPT+enamine) represents less than 8% (precisely, 6.4%) and the amount of coupling system (TESPD+enamine+DPG) according to the invention advantageously represents less than 10% (precisely, 8.3%) relative to the weight of reinforcing white filler (80 phr).

The procedure is as in Tests 12 and 13 above, by subjecting the tires to on-road travel, this time on a vehicle of the marque Citroen Xantia. At the end of the test, a gain of 3% in wear resistance is noted for the tire according to the invention, without adversely affecting the other running performances, compared with the control tire. The rubber composition of the tread of the control tire, however, contains an amount of TESPT which is more than 30% higher than the tire according to the invention.

In conclusion, as shown by the various tests above, the novel coupling system (white filler/diene elastomer) according to the invention, which is formed by the association of a polysulphurized alkoxysilane, an enamine and a guanidine derivative, offers a particularly advantageous compromise of properties to the compositions of the invention, compared with compositions reinforced with a white filler of the prior art.

In this novel coupling system, the enamine and the guanidine derivative, used in combination as coupling activator, make it possible to very substantially reduce the amounts of polysulphurized alkoxysilanes conventionally used in the rubber compositions for tires reinforced with a white filler. The invention thus makes it possible to reduce the cost of the rubber compositions, and therefore that of the tires manufactured from such compositions.

The invention also makes it possible, if a high amount of polysulphurized alkoxysilane is maintained, to obtain a higher level of coupling, and therefore to obtain a better level of reinforcement of the rubber compositions by the reinforcing white filler.

TABLE 1

| Composition No.: | 1 | 2 |
|---|---|---|
| SBR (1) | 75 | 75 |
| BR (2) | 25 | 25 |
| silica (3) | 80 | 80 |
| aromatic oil | 35 | 35 |
| TESPT (Si69) | 6.4 | 6.4 |
| enamine (4) | — | 0.5 |
| ZnO | 2.5 | 2.5 |
| stearic acid | 2 | 2 |
| antioxidant (5) | 1.9 | 1.9 |
| DPG (6) | 1.5 | 1.5 |
| sulphur | 1.1 | 1.1 |
| CBS (7) | 2 | 2 |

(1) SBR with 59.5% of 1,2-polybutadiene units; 26.5% of styrene; extended with 37.5% of oil (Tg = −29° C.) ; expressed in dry SBR;
(2) BR with 4.3% of 1,2; 2.7% of trans; 93% of cis-1,4 (Tg = −106° C.);
(3) silica Zeosil 1165MP manufactured by Rhodia;
(4) enamine of formula III-0 (Meramid FC from Great Lakes);
(5) N-1,3-dimethylbutyl-N-phenyl-para-phenylenediamine;
(6) diphenylguanidine;
(7) N-cyclohexyl-2-benzothiazyl sulphenamide.

TABLE 2

| Composition No.: | 1 | 2 |
|---|---|---|
| Properties before curing: | | |
| Mooney (MU) | 78 | 83 |
| T5 (min) | 19 | 13 |
| Properties after curing: | | |
| M10 (MPa) | 5.2 | 5.0 |
| M100 (MPa) | 1.7 | 1.8 |
| M300 (MPa) | 2.2 | 2.6 |
| M300/M100 | 1.3 | 1.4 |
| HL (%) | 27 | 24 |
| Breaking stress (MPa) | 20.3 | 22.9 |
| Elongation at break (%) | 516 | 495 |

TABLE 3

| Composition No.: | 3 | 4 | 5 | 6 |
|---|---|---|---|---|
| SBR (1) | 75 | 75 | 75 | 75 |
| BR (2) | 25 | 25 | 25 | 25 |
| silica (3) | 80 | 80 | 80 | 80 |
| TESPT (Si69) | 6.4 | 4 | 4 | 4.8 |
| enamine (4) | — | — | 0.5 | 0.25 |
| ZnO | 2.5 | 2.5 | 2.5 | 2.5 |
| stearic acid | 2 | 2 | 2 | 2 |
| antioxidant (5) | 1.9 | 1.9 | 1.9 | 1.9 |
| DPG (6) | 1.5 | 1.5 | 1.5 | 1.5 |
| sulphur | 1.1 | 1.1 | 1.1 | 1.1 |
| CBS (7) | 2 | 2 | 2 | 2 |

(1) to (7) idem Table 1.

TABLE 4

| Composition No.: | 3 | 4 | 5 | 6 |
|---|---|---|---|---|
| Properties before curing: | | | | |
| Mooney (MU) | 80 | 103 | 92 | 87 |
| T5 (min) | 18 | 16 | 14 | 16 |
| Properties after curing: | | | | |
| M10 (MPa) | 5.6 | 5.9 | 5.8 | 5.8 |
| M100 (MPa) | 1.6 | 1.4 | 1.6 | 1.5 |
| M300 (MPa) | 1.9 | 1.6 | 1.8 | 1.8 |
| M300/M100 | 1.19 | 1.09 | 1.18 | 1.19 |
| HL (%) | 30 | 32 | 30 | 31 |
| Breaking stress (MPa) | 21.7 | 21.7 | 21.7 | 22.2 |
| Elongation at break (%) | 615 | 669 | 605 | 625 |

TABLE 5

| Composition No.: | 7 | 8 | 9 |
|---|---|---|---|
| SBR (1) | 75 | 75 | 75 |
| BR (2) | 25 | 25 | 25 |
| silica (3) | 80 | 80 | 80 |
| aromatic oil | 35 | 35 | 35 |
| TESPT (Si69) | 6.4 | — | — |
| TESPD (Si266) | — | 5.6 | 5.6 |
| enamine (4) | — | — | 0.5 |
| ZnO | 2.5 | 2.5 | 2.5 |
| stearic acid | 2 | 2 | 2 |
| antioxidant (5) | 1.9 | 1.9 | 1.9 |
| DPG (6) | 1.5 | 1.5 | 1.5 |
| sulphur | 1.1 | 1.1 | 1.1 |
| CBS (7) | 2 | 2 | 2 |

(1) to (7) idem Table 1.

TABLE 6

| Composition No.: | 7 | 8 | 9 |
|---|---|---|---|
| Properties before curing: | | | |
| Mooney (MU) | 98 | 103 | 94 |
| T5 (min) | 29 | >30 | 26 |
| Properties after curing: | | | |
| M10 (MPa) | 4.5 | 4.4 | 4.3 |
| M100 (MPa) | 1.4 | 1.1 | 1.3 |
| M300 (MPa) | 1.8 | 1.2 | 1.7 |
| M300/M100 | 1.29 | 1.05 | 1.28 |
| HL (%) | 26 | 32 | 26 |
| Breaking stress (MPa) | 24.3 | 22.3 | 25.7 |
| Elongation at break (%) | 647 | 730 | 685 |

TABLE 7

| Composition No.: | 10 | 11 | 12 |
|---|---|---|---|
| SBR (1) | 75 | 75 | 75 |
| BR (2) | 25 | 25 | 25 |
| silica (3) | 80 | 80 | 80 |
| aromatic oil | 35 | 35 | 35 |
| TESPT (Si69) | 6.4 | 6.4 | 6.4 |
| enamine (4) | — | 0.5 | — |
| enamine (4') | — | — | 0.55 |
| ZnO | 2.5 | 2.5 | 2.5 |
| stearic acid | 2 | 2 | 2 |
| antioxidant (5) | 1.9 | 1.9 | 1.9 |
| DPG (6) | 1.5 | 1.5 | 1.5 |
| sulphur | 1.1 | 1.1 | 1.1 |
| CBS (7) | 2 | 2 | 2 |

(1) to (3) idem Table 1;
(4) enamine of formula III-1 (1-pyrrolidino-1-cyclopentene; Aldrich);
(4') enamine of formula III-2 (1-pyrrolidino-1-cyclohexene; Aldrich);
(5) to (7) idem Table 1.

TABLE 8

| Composition No.: | 10 | 11 | 12 |
|---|---|---|---|
| Properties before curing: | | | |
| Mooney (MU) | 91 | 95 | 95 |
| Properties after curing: | | | |
| M10 (MPa) | 5.6 | 5.6 | 5.7 |
| M100 (MPa) | 1.8 | 2.0 | 1.9 |
| M300 (MPa) | 2.2 | 2.7 | 2.6 |
| M300/M100 | 1.23 | 1.36 | 1.32 |
| HL (%) | 30 | 27 | 28 |
| Breaking stress (MPa) | 22.2 | 23.1 | 22.6 |
| Elongation at break (%) | 561 | 504 | 502 |

TABLE 9

| Composition No.: | 13 | 14 | 15 | 16 |
|---|---|---|---|---|
| SBR (1) | 75 | 75 | 75 | 75 |
| BR (2) | 25 | 25 | 25 | 25 |
| silica (3) | 80 | 80 | 80 | 80 |
| TESPT (Si69) | 6.4 | 4 | 4 | 4 |
| enamine (4) | — | — | 0.5 | — |
| enamine (4') | — | — | — | 0.55 |
| ZnO | 2.5 | 2.5 | 2.5 | 2.5 |
| stearic acid | 2 | 2 | 2 | 2 |
| antioxidant (5) | 1.9 | 1.9 | 1.9 | 1.9 |
| DPG (6) | 1.5 | 1.5 | 1.5 | 1.5 |
| sulphur | 1.1 | 1.1 | 1.1 | 1.1 |
| CBS (7) | 2 | 2 | 2 | 2 |

(1) to (7) idem Table 7.

TABLE 10

| Composition No.: | 13 | 14 | 15 | 16 |
|---|---|---|---|---|
| Properties before curing: | | | | |
| Mooney (MU) | 91 | 116 | 113 | 108 |
| Properties after curing: | | | | |
| M10 (MPa) | 5.6 | 5.5 | 5.8 | 5.7 |
| M100 (MPa) | 1.8 | 1.5 | 1.7 | 1.6 |
| M300 (MPa) | 2.2 | 1.6 | 2.2 | 2.0 |
| M300/M100 | 1.23 | 1.06 | 1.25 | 1.21 |
| HL (%) | 30 | 36 | 32 | 32 |
| Breaking stress (MPa) | 22.2 | 22.2 | 23 | 23.7 |
| Elongation at break (%) | 561 | 712 | 574 | 624 |

TABLE 11

| Composition No.: | 17 | 18 |
|---|---|---|
| SBR (1) | 75 | 75 |
| BR (2) | 25 | 25 |
| silica (3) | 80 | 80 |
| aromatic oil | 35 | 35 |
| TESPD (Si266) | 5.6 | 5.6 |
| enamine (4) | — | 0.5 |
| ZnO | 2.5 | 2.5 |
| stearic acid | 2 | 2 |
| antioxidant (5) | 1.9 | 1.9 |
| DPG (6) | 1.5 | 1.5 |
| sulphur | 1.1 | 1.1 |
| CBS (7) | 2 | 2 |

(1) to (7) idem Table 7.

TABLE 12

| Composition No.: | 17 | 18 |
|---|---|---|
| Properties before curing: | | |
| Mooney (MU) | 92 | 80 |
| Properties after curing: | | |
| M10 (MPa) | 4.4 | 4.6 |
| M100 (MPa) | 1.2 | 1.3 |
| M300 (MPa) | 1.3 | 1.4 |
| M300/M100 | 1.02 | 1.08 |
| HL (%) | 37 | 34 |
| Breaking stress (MPa) | 21 | 22.4 |
| Elongation at break (%) | 750 | 734 |

TABLE 13

| Composition No.: | 19 | 20 |
|---|---|---|
| SBR (1) | 75 | 75 |
| BR (2) | 25 | 25 |
| silica (3) | 80 | 80 |
| aromatic oil | 35 | 35 |
| silane (8) | 6.4 | 6.4 |
| enamine (4) | — | 0.5 |
| ZnO | 2.5 | 2.5 |
| stearic acid | 2 | 2 |
| antioxidant (5) | 1.9 | 1.9 |
| DPG (6) | 1.5 | 1.5 |
| sulphur | 1.1 | 1.1 |
| CBS (7) | 2 | 2 |

(1) to (7) idem Table 1;
(8) silane formula (II).

TABLE 14

| Composition No.: | 19 | 20 |
|---|---|---|
| Properties before curing: | | |
| Mooney (MU) | 90 | 91 |
| T5 (min) | 16 | 12 |
| Properties after curing: | | |
| M10 (MPa) | 5.6 | 5.8 |
| M100 (MPa) | 1.5 | 1.8 |
| M300 (MPa) | 1.7 | 2.3 |
| M300/M100 | 1.13 | 1.27 |
| HL (%) | 33 | 28.5 |
| Breaking stress (MPa) | 20.4 | 20.1 |
| Elongation at break (%) | 675 | 540 |

TABLE 15

| Composition No.: | 21 | 22 |
|---|---|---|
| SBR (1) | 75 | 75 |
| BR (2) | 25 | 25 |
| silica (3) | 49.5 | 49.5 |
| alumina (3') | 49.5 | 49.5 |
| aromatic oil | 35 | 35 |
| TESPT (Si69) | 6.5 | 6.5 |
| enamine (4) | — | 0.5 |
| ZnO | 2.5 | 2.5 |
| stearic acid | 2 | 2 |
| antioxidant (5) | 1.9 | 1.9 |
| DPG (6) | 0.9 | 0.9 |
| sulphur | 1.1 | 1.1 |
| CBS (7) | 2 | 2 |

(1) to (7) idem Table 1;
(3') alumina CR125 from Baïkowski

TABLE 16

| Composition No.: | 21 | 22 |
|---|---|---|
| Properties before curing: | | |
| Mooney (MU) | 50 | 52 |
| T5 (min) | 14 | 12 |
| Properties after curing: | | |
| M10 (MPa) | 5.1 | 5.1 |
| M100 (MPa) | 1.7 | 1.8 |
| M300 (MPa) | 2.1 | 2.2 |
| M300/M100 | 1.18 | 1.23 |
| HL (%) | 31 | 29 |
| Breaking stress (MPa) | 21.7 | 23.2 |
| Elongation at break (%) | 591 | 609 |

TABLE 17

| Composition No.: | 23 | 24 | 25 |
|---|---|---|---|
| SBR (1) | 75 | 75 | 75 |
| BR (2) | 25 | 25 | 25 |
| silica (3) | 62 | 62 | 62 |
| alumina (3') | 26 | 26 | 26 |
| aromatic oil | 35 | 35 | 35 |
| TESPT (Si69) | 6.0 | 6.0 | 6.0 |
| enamine (4) | — | 0.5 | — |
| enamine (4') | — | — | 0.55 |
| ZnO | 2.5 | 2.5 | 2.5 |
| stearic acid | 2 | 2 | 2 |
| antioxidant (5) | 1.9 | 1.9 | 1.9 |
| DPG (6) | 1.2 | 1.2 | 1.2 |

TABLE 17-continued

| Composition No.: | 23 | 24 | 25 |
|---|---|---|---|
| sulphur | 1.1 | 1.1 | 1.1 |
| CBS (7) | 2 | 2 | 2 |

(1) to (7) idem Table 1;
(3') alumina APA-100RDX from Condéa;
(4') idem Table 7 (enamine of formula III-2).

TABLE 18

| Composition No.: | 23 | 24 | 25 |
|---|---|---|---|
| Properties before curing: | | | |
| Mooney (MU) | 74 | 74 | 77 |
| Properties after curing: | | | |
| M10 (MPa) | 4.7 | 4.8 | 4.2 |
| M100 (MPa) | 1.6 | 1.9 | 1.7 |
| M300 (MPa) | 2.0 | 2.4 | 2.1 |
| M300/M100 | 1.20 | 1.28 | 1.30 |
| HL (%) | 28 | 25 | 26 |
| Breaking stress (MPa) | 20.7 | 20.8 | 21.3 |
| Elongation at break (%) | 587 | 539 | 560 |

TABLE 19

| Composition No.: | 26 | 27 | 28 |
|---|---|---|---|
| SBR (1) | 75 | 75 | 75 |
| BR (2) | 25 | 25 | 25 |
| silica (3) | 80 | 80 | 80 |
| aromatic oil | 35 | 35 | 35 |
| TESPT (Si69) | 6.4 | 6.4 | 6.4 |
| enamine (4) | — | 0.5 | 0.5 |
| ZnO | 2.5 | 2.5 | 2.5 |
| stearic acid | 2 | 2 | 2 |
| antioxidant (5) | 1.9 | 1.9 | 1.9 |
| DPG (6) | 1.5 | 1.5 | — |
| sulphur | 1.1 | 1.1 | 1.1 |
| CBS (7) | 2 | 2 | 2 |

(1) to (7) idem Table 1.

TABLE 20

| Composition No.: | 26 | 27 | 28 |
|---|---|---|---|
| Properties before curing: | | | |
| Mooney (MU) | 84 | 87 | 98 |
| T5 (min) | 20 | 12 | 20 |
| Properties after curing: | | | |
| M10 (MPa) | 5.7 | 6.1 | 4.7 |
| M100 (MPa) | 1.7 | 2.0 | 1.6 |
| M300 (MPa) | 2.0 | 2.5 | 1.8 |
| M300/M100 | 1.20 | 1.25 | 1.10 |
| HL (%) | 30 | 27 | 32 |
| Breaking stress (MPa) | 19.3 | 19.5 | 20.9 |
| Elongation at break (%) | 532 | 473 | 663 |

TABLE 21

| Composition No.: | 29 | 30 | 31 |
|---|---|---|---|
| SBR (1) | 75 | 75 | 75 |
| BR (2) | 25 | 25 | 25 |
| silica (3) | 80 | 80 | 80 |
| aromatic oil | 35 | 35 | 35 |
| TESPT (Si69) | 6.4 | 6.4 | 6.4 |

TABLE 21-continued

| Composition No.: | 29 | 30 | 31 |
|---|---|---|---|
| enamine (4') | — | 0.55 | 0.55 |
| ZnO | 2.5 | 2.5 | 2.5 |
| stearic acid | 2 | 2 | 2 |
| antioxidant (5) | 1.9 | 1.9 | 1.9 |
| DPG (6) | 1.5 | 1.5 | 1.5 |
| sulphur | 1.1 | 1.1 | 1.1 |
| CBS (7) | 2 | 2 | 2 |

(1) to (3), (4'), (5) to (7) idem Table 7.

TABLE 22

| Composition No.: | 29 | 30 | 31 |
|---|---|---|---|
| Properties before curing: | | | |
| Mooney (MU) | 84 | 90 | 88 |
| Properties after curing: | | | |
| M10 (MPa) | 5.6 | 5.3 | 5.5 |
| M100 (MPa) | 1.7 | 1.8 | 1.8 |
| M300 (MPa) | 2.1 | 2.4 | 2.2 |
| M300/M100 | 1.20 | 1.31 | 1.22 |
| HL (%) | 29.5 | 27 | 29.5 |
| Breaking stress (MPa) | 19.4 | 22 | 22.1 |
| Elongation at break (%) | 533 | 509 | 536 |

TABLE 23

| Composition No.: | 32 | 33 |
|---|---|---|
| SBR (1) | 75 | 75 |
| BR (2) | 25 | 25 |
| silica (3) | 80 | 80 |
| aromatic oil | 34 | 34 |
| TBSPT (Si69) | 6.4 | 4 |
| enamine (4) | — | 0.5 |
| ZnO | 2.5 | 2.5 |
| stearic acid | 2 | 2 |
| paraffin (9) | 1.5 | 1.5 |
| antioxidant (5) | 1.9 | 1.9 |
| DPG (6) | 1.5 | 1.5 |
| sulphur | 1.1 | 1.1 |
| CBS (7) | 2 | 2 |

(1) to (7) idem Table 1;
(9) mixture of macro- and microcrystalline antiozone waxes.

TABLE 24

| Composition No.: | 34 | 35 |
|---|---|---|
| SBR (1) | 75 | 75 |
| BR (2) | 25 | 25 |
| silica (3) | 80 | 80 |
| aromatic oil | 34 | 34 |
| silane (8) | 6.4 | 6.4 |
| enamine (4) | — | 0.5 |
| ZnO | 2.5 | 2.5 |
| paraffin oil (9) | 1.5 | 1.5 |
| stearic acid | 2 | 2 |
| antioxidant (5) | 1.9 | 1.9 |
| DPG (6) | 1.5 | 1.5 |
| sulphur | 1.1 | 1.1 |
| CBS (7) | 2 | 2 |

(1) to (8) idem Table 13;
(9) idem Table 23.

TABLE 25

| Composition No.: | 36 | 37 |
|---|---|---|
| SBR (1) | 75 | 75 |
| BR (2) | 25 | 25 |
| silica (3) | 80 | 80 |
| aromatic oil | 34 | 34 |
| TESPT (Si69) | 6.4 | 4.8 |
| enamine (4) | — | 0.3 |
| ZnO | 2.5 | 2.5 |
| paraffin (9) | 1.5 | 1.5 |
| stearic acid | 2 | 2 |
| antioxidant (5) | 1.9 | 1.9 |
| DPG (6) | 1.5 | 1.5 |
| sulphur | 1.1 | 1.1 |
| CBS (7) | 2 | 2 |

(1) to (9) idem Table 23.

What is claimed is:

1. A rubber composition usable for the manufacture of tires, comprising, as base constituents, a diene elastomer, a reinforcing white filler, and a coupling system, said coupling system comprising a polysuphurized alkoxysilane coupling agent (white filler/diene elastomer) associated with an enamine and a guanidine derivative.

2. The rubber composition according to claim 1, in which the guanidine derivative is diphenylguanidine.

3. The rubber composition according to claim 1, in which the polysulphurized alkoxysilane is a bis-alkoxy($C_1$–$C_4$) silylpropyl polysulphide.

4. The rubber composition according to claim 3, in which the polysulphurized alkoxysilane is bis-3-triethoxysilylpropyl tetrasulphide.

5. The rubber composition according to claim 3, in which the polysulphurized alkoxysilane is bis-3-triethoxysilylpropyl disulphide.

6. The rubber composition according to claim 1, in which the polysulphurized alkoxysilane corresponds to the formula:

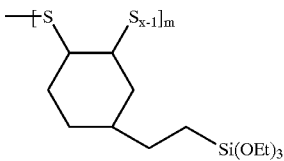

in which x=1 to 8, m=1 to 200, and OEt represents an ethoxyl radical.

7. The rubber composition according to claim 1, in which the quantity of polysulphurized alkoxysilane represents less than 8% relative to the weight of reinforcing white filler.

8. The rubber composition according to claim 7, in which the quantity of polysulphurized alkoxysilane represents less than 6% relative to the weight of reinforcing white filler.

9. The rubber composition according to claim 1, in which the enamine has the formula (III-0):

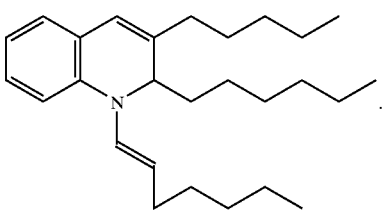

10. The rubber composition according to claim 1, in which the enamine is an enamines derived from dibutylamine, aniline, piperidine or pyrrolidine.

11. A rubber composition according to claim 10, in which the enamine orresponds to formula (III-1) or (III-2):

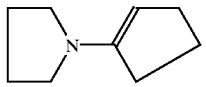

(III-1)

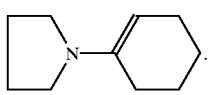

(III-2)

12. The rubber composition according to claim 1, in which the quantity of enamine represents between 1% and 25% relative to the weight of polysulphurized alkoxysilane.

13. The rubber composition according to claim 12, in which the quantity of enamine represents between 3% and 17.5% relative to the weight of polysulphurized alkoxysilane.

14. The rubber composition according to claim 1, in which the total quantity of the polysulphurized alkoxysilane and the enamine represents less than 10% relative to the weight of reinforcing white filler.

15. The rubber composition according to claim 14, in which the total quantity of the polysulphurized alkoxysilane and the enamine represents less than 8% relative to the weight of reinforcing white filler.

16. The rubber composition according to claim 1, in which the quantity of guanidine derivative represents between 0.5 and 4% relative to the weight of reinforcing white filler.

17. The rubber composition according to claim 1, in which the total quantity of the coupling system comprising the polysulphurized alkoxysilane, the enamine and the guanidine derivative represents between 1% and 20% relative to the weight of reinforcing white filler.

18. The rubber composition according to claim 17, in which the total quantity of the coupling system comprising the polysulphurized alkoxysilane, the enamine and the guanidine derivative represents between 5% and 15% relative to the weight of reinforcing white filler.

19. The rubber composition according to claim 18, in which the total quantity of the coupling system comprising the polysulphurized alkoxysilane, the enamine and the guanidine derivative represents less than 12% relative to the weight of reinforcing white filler.

20. The rubber composition according to claim 19, in which the total quantity of the coupling system comprising the polysulphurized alkoxysilane, the enamine and the guanidine derivative represents less than 10% relative to the weight of reinforcing white filler.

21. The rubber composition according to claim 1, in which the reinforcing white filler comprises silica.

22. The rubber composition according to claim 1, in which the reinforcing white filler constitutes the entire reinforcing filler.

23. The rubber composition according to claim 1, further comprising carbon black as filler.

24. The rubber composition according to claim 1, in which the diene elastomer is selected from the group consisting of polybutadienes, polyisoprenes (natural rubber), butadiene-styrene copolymers, butadiene-isoprene copolymers, isoprene-styrene copolymers, butadiene-styrene-isoprene copolymers, and mixtures thereof.

25. The rubber composition according to claim 24, in which the diene elastomer is a butadiene-styrene copolymer.

26. The rubber composition according to claim 25, in which the diene elastomer is a mixture of a butadiene-styrene copolymer and a polybutadiene.

27. The rubber composition according to claim 25 or 26, in which the butadiene-styrene copolymer is prepared in solution and has a styrene content of between 20% and 30% by weight, a content of vinyl bonds of the butadiene part of between 15% and 65%, a content of trans-1,4 bonds of between 20% and 75% and a glass transition temperature of between −20° C. and −55° C.

28. The rubber composition according to claim 26, in which the polybutadiene has more than 90% cis-1,4 bonds.

29. A process for preparing a rubber composition usable in the manufacture of a tire comprising incorporating by kneading into a diene elastomer, a reinforcing white filler and a coupling system, said coupling system comprising a polysulphurized alkoxysilane coupling agent (white filler/diene elastomer), an enamine and a guanidine derivative.

30. A process according to claim 29, wherein the incorporating is carried out in one or more steps and that the entire mixture is thermomechanically kneaded until a maximum temperature of between 130° C. and 200° C. is reached.

31. A process according to claim 28, wherein the maximum kneading temperature is between 145° C. and 180° C.

32. A rubber composition prepared by the method of any one of claims 29 to 31.

33. A tire or a semi-finished rubber product intended for tires, selected from the group consisting of treads, underlayers for such treads, crown plies, sidewalls, carcass plies, beads, protectors, inner tubes and airtight internal rubbers for tubeless tires comprising a rubber composition, said rubber composition comprising as base constituents, a diene elastomer, a reinforcing white filler and a coupling system, said coupling system comprising a polysulfurized alkoxysilane coupling agent in association with an enamine and a guanidine derivative.

34. A semi-finished product according to claim 33, consisting of a tread.

35. The tread according to claim 34, characterised in that it is based on a rubber composition according to any one of claims 24 to 28.

36. A coupling system (white filler/diene elastomer) for a rubber composition based on a diene elastomer reinforced by a white filler, usable for the manufacture of tires, the coupling system comprising a polysulphurized alkoxysilane coupling agent in association with, an enamine and a guanidine derivative.

37. The coupling system according to claim 36, in which the polysulphurized alkoxysilane represents more than 50% by weight of the coupling system.

38. The coupling system according to claim 36, in which the guanidine derivative is diphenylguanidine.

39. The coupling system according to claim 36, in which the polysulphurized alkoxysilane is a bis-$(C_1-C_4)$alkoxyl silylpropyl polysulphide.

40. The coupling system according to claim 39, in which the polysulphurized alkoxysilane is bis-3-triethoxysilylpropyl tetrasulphide.

41. The coupling system according to claim 39, in which the polysulphurized alkoxysilane is bis-3-triethoxysilylpropyl disulphide.

42. The coupling system according to claim 36, in which the polysulphurized alkoxysilane corresponds to the formula:

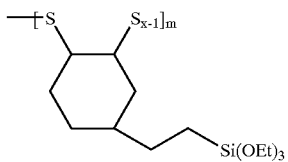

in which x=1 to 8, m=1 to 200, and OEt represents an ethoxyl radical.

43. The coupling system according to claim 36, in which the enamine has the formula (III-0):

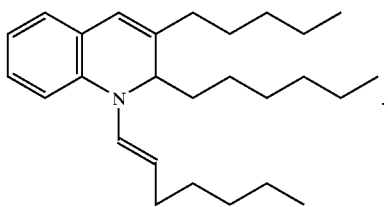

44. The coupling system according to claim 36, in which the enamine is an enamine derived from dibutylamine, aniline, piperidine or pyrrolidine.

45. The coupling system according to claim 44, in which the enamine corresponds to formula (III-1) or (III-2):

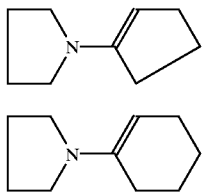

46. A method of coupling a reinforcing white filler and a diene elastomer in a rubber composition usable for the manufacture of tires comprising adding to said diene elastomer and reinforcing white filler a coupling system comprising a polysulfurized alkoxysilane coupling agent, an enamine and a guanidine derivative.

47. The method according to claim 46, wherein the enamine and guanidine derivative activate the coupling function (white filler/diene elastomer) of the polysulphurized alkoxysilane.

48. The method according to claim 47, in which the polysulphurized alkoxysilane is a bis-($C_1$–$C_4$)alkoxy silyl-propyl polysulphide.

49. The method according to claim 48, in which the polysulphurized alkoxysilane is bis-3-triethoxysilylpropyl tetrasulphide.

50. The method according to claim 48, in which the polysulphurized alkoxysilane is bis-3-triethoxysilylpropyl disulphide.

51. The method according to claim 47, in which the polysulphurized alkoxysilane corresponds to the formula:

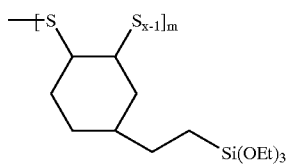

in which x=1 to 8, m=1 to 200, and OEt represents an ethoxyl radical.

52. The method according to claim 47, in which the enamine has the formula (III-0):

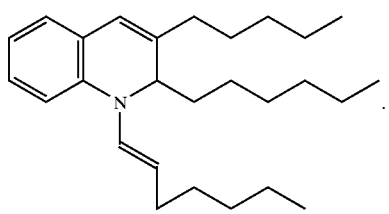

53. The method according to claim 47, in which the enamine is an enamine derived from dibutylamine, aniline, piperidine or pyrrolidine.

54. The method according to claim 53, in which the enamine corresponds to formula (III-1) or (III-2):

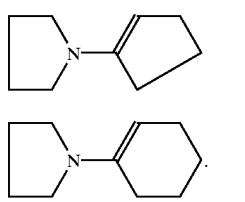

55. The method according to claim 47, in which the guanidine derivative is diphenylguanidine.

* * * * *

UNITED STATES PATENT AND TRADEMARK OFFICE
CERTIFICATE OF CORRECTION

PATENT NO. : 6,420,488 B1
DATED : July 16, 2002
INVENTOR(S) : Christophe Penot

It is certified that error appears in the above-identified patent and that said Letters Patent is hereby corrected as shown below:

Column 1,
Line 32, "homogenously" should read -- homogeneously --
Line 36, "homogenously" should read -- homogeneously --

Column 7,
Line 31, "prefcrably" should read -- preferably --

Column 14,
Line 8, "matraix." should read -- matrix. --

Column 15,
Line 65, "enarnine" should read -- enamine --

Column 16,
Line 40, "5" should be deleted

Column 17,
Line 3, "Hüils" should read -- Hüls --

Column 33,
Line 5, "orresponds" should read -- corresponds --

Column 34,
Line 36, "constituents," should read -- constituents --
Line 51, "with," should read -- with --

Signed and Sealed this

Eleventh Day of February, 2003

JAMES E. ROGAN
*Director of the United States Patent and Trademark Office*